US011212095B2

(12) United States Patent
Brickell

(10) Patent No.: US 11,212,095 B2
(45) Date of Patent: *Dec. 28, 2021

(54) ALLOWING RESTRICTED EXTERNAL ACCESS TO DEVICES

(71) Applicant: Ernest Brickell, Hillsboro, OR (US)

(72) Inventor: Ernest Brickell, Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/384,551

(22) Filed: Jul. 23, 2021

(65) Prior Publication Data
US 2021/0351926 A1 Nov. 11, 2021

Related U.S. Application Data

(60) Division of application No. 16/951,553, filed on Nov. 18, 2020, now Pat. No. 11,115,208, which is a division of application No. 16/680,009, filed on Nov. 11, 2019, now Pat. No. 10,855,465, which is a continuation-in-part of application No. 15/348,210, filed on Nov. 10, 2016, now Pat. No. 10,498,712.

(30) Foreign Application Priority Data

Nov. 10, 2016 (WO) ................. PCT/US2016/061341

(51) Int. Cl.
*H04L 9/08* (2006.01)
*G06F 21/71* (2013.01)
*H04L 29/06* (2006.01)

(52) U.S. Cl.
CPC ............ *H04L 9/0894* (2013.01); *G06F 21/71* (2013.01); *H04L 9/0819* (2013.01); *H04L 9/0897* (2013.01); *H04L 63/062* (2013.01); *G06F 2221/2101* (2013.01)

(58) Field of Classification Search
CPC ... H04L 9/0894; H04L 9/0897; H04L 9/0819; H04L 63/062; G06F 21/71; G06F 2221/2101
See application file for complete search history.

(56) References Cited

U.S. PATENT DOCUMENTS

| | | | | |
|---|---|---|---|---|
| 5,937,066 A * | 8/1999 | Gennaro | ............... | H04L 9/0897 380/286 |
| 6,968,456 B1 * | 11/2005 | Tripathi | .................. | G06F 21/64 707/999.009 |
| 7,657,531 B2 * | 2/2010 | Bisbee | .................. | H04L 9/3226 713/182 |
| 8,127,149 B1 * | 2/2012 | Nachenberg | ........ | G06F 21/6218 713/193 |
| 8,422,682 B2 * | 4/2013 | Ortiz Cornet | .......... | G06F 21/64 380/277 |
| 9,514,324 B1 * | 12/2016 | Potlapally | ............... | H04L 63/10 |
| 9,559,842 B2 * | 1/2017 | Baldwin | ................ | H04L 9/083 |

(Continued)

*Primary Examiner* — James R Turchen
(74) *Attorney, Agent, or Firm* — Edward J. Radlo; Radlo & Su

(57) ABSTRACT

Methods and apparatus for auditing uses of cryptographic keys. In a method embodiment of the present invention, a set of audited uses for a cryptographic key is defined; the key is generated inside a protected execution environment of a digital computer; all software and firmware that is usable in the execution environment to access the key is demonstrated to an auditor; and, for each audited use of the key, a non-tamperable audit record describing said use is released.

13 Claims, 11 Drawing Sheets

(56) References Cited

U.S. PATENT DOCUMENTS

| | | | |
|---|---|---|---|
| 2003/0041250 A1* | 2/2003 | Proudler | G06F 21/6245 713/182 |
| 2005/0210286 A1* | 9/2005 | Jerdonek | H04L 63/10 726/5 |
| 2005/0235141 A1* | 10/2005 | Ibrahim | G06F 21/57 713/164 |
| 2007/0165264 A1* | 7/2007 | Minami | G06F 21/57 358/1.14 |
| 2007/0271592 A1* | 11/2007 | Noda | H04L 9/3234 726/1 |
| 2008/0219445 A1* | 9/2008 | Yato | H04L 63/0428 380/255 |
| 2009/0016534 A1* | 1/2009 | Cornet | G06F 21/64 380/277 |
| 2009/0092252 A1* | 4/2009 | Noll | H04L 9/0891 380/277 |
| 2009/0205044 A1* | 8/2009 | Challener | G06F 21/552 726/22 |
| 2010/0235912 A1* | 9/2010 | Hermann | G06F 21/57 726/23 |
| 2010/0269156 A1* | 10/2010 | Hohlfeld | G06F 21/6218 726/4 |
| 2011/0225114 A1* | 9/2011 | Gotthardt | H04L 9/0816 706/50 |
| 2012/0170753 A1* | 7/2012 | Pandrangi | G06F 21/6209 380/286 |
| 2012/0296876 A1* | 11/2012 | Bacinschi | G06F 11/3006 707/687 |
| 2015/0172321 A1* | 6/2015 | Kirti | H04L 63/1441 726/1 |
| 2016/0065363 A1* | 3/2016 | Amiri | H04L 9/0822 380/281 |
| 2016/0065371 A1* | 3/2016 | Vecera | H04L 9/0897 713/193 |
| 2016/0089606 A1* | 3/2016 | Javed Lal Mohammed Ameerjan | A63F 13/35 463/29 |
| 2017/0063547 A1* | 3/2017 | Brandt | H04L 9/0894 |
| 2017/0103228 A1* | 4/2017 | Yavuz | H04L 9/083 |
| 2017/0272472 A1* | 9/2017 | Adhar | G06F 21/316 |
| 2017/0338949 A1* | 11/2017 | Amiri | H04L 63/0428 |
| 2018/0131677 A1* | 5/2018 | Brickell | H04L 63/061 |

* cited by examiner

ALLOWING RESTRICTED EXTERNAL ACCESS TO DEVICES

RELATED APPLICATIONS

This patent application is a divisional of commonly-owned U.S. patent application Ser. No. 16/951,553 filed Nov. 18, 2020, which is a divisional of commonly-owned U.S. patent application Ser. No. 16/680,009 filed Nov. 11, 2019, now U.S. Pat. No. 10,855,465 issued Dec. 1, 2020, which is a continuation-in-part (CIP) of commonly-owned U.S. patent application Ser. No. 15/348,210 filed Nov. 10, 2016, now U.S. Pat. No. 10,498,712 issued Dec. 3, 2019, which corresponds to commonly-owned PCT patent application PCT/2016/061341 filed Nov. 10, 2016; all of these previously filed patent applications are hereby incorporated by reference into the present patent application.

TECHNICAL FIELD

The present invention relates generally to allowing other than primary users restricted access to devices under the condition that the access is authorized and recorded.

BACKGROUND ART

There is prior art disclosing the design and implementation of partitions in a computing device. One example is an Operating System that creates separate partitions for different users, and separate partitions for different applications used by one user. Virtualization is a second example of a technique used to create partitions. A virtual machine monitor creates separate partitions that can each execute a separate operating system. A third example of a technique used to create partitions consists of two separate microprocessors, each executing different software, with hardware to separate resources as required by the device. This third example is the case with Intel® devices containing the Intel® Management Engine™ (ME, later renamed Converged Security Management Engine™), a trusted execution environment, which is a separate microprocessor from the main microprocessor. The ME can get input from the user and produce a display that cannot be viewed by any software executing on the main microprocessor. A fourth example of a technique used to create partitions is illustrated by the ARM (Advanced Resource Managers) TrustZone® technology, which provides for a normal OS and a secure OS to execute on the same processor, with the property that the execution in the secure OS is protected from the normal OS. ARM has also implemented trusted input and display capabilities for Trust-Zone®, as described in trusted execution environment documents. A fifth example of a technique used to create partitions is the Intel® Software Guard Extensions™ (SGX), another trusted execution environment. SGX provides an enclave to execute an application protected from all other software and firmware on the device. U.S. published patent application 20150086012 describes a method to add protected display to SGX and U.S. published patent application 20140359305 describes a method to add protected input to SGX. Thus, there are three different approaches that provide for partitions for executing software that is protected from other software on the system, and provide secure input, output, and storage to the protected partition. However, none of these approaches meet all the requirements laid out in this invention.

There is prior art disclosing the design and implementation of key escrow systems, wherein a key escrow agent is provided with cryptographic keys that can be used to decrypt communications from a device. However, in the prior art, the device does not know whether messages from the device are being exposed by the key escrow agent. If the device did have that information, the user could be informed whether messages from the device had been exposed, perhaps not immediately, but after some time delay. Thus, there is a need as described in this invention for a key escrow system in which the device does know, and can inform the user, of the possibility that messages from the device have been exposed by the key escrow system.

DISCLOSURE OF INVENTION

This invention comprises apparatus and methods for balancing public and personal security needs in a computing device (1). In an apparatus embodiment, the device (1) comprises a first partition (310) in which only applications (312) authorized by a protected application approval entity can execute; a second partition (205) in which applications that execute can be accessed by an authorized external access entity; and, coupled to the partitions (310,205), protection modules (215, 250, 290) configured to protect data used by applications (312) authorized to execute in the first partition (310) and to prevent even authorized external access entities from accessing protected data used by applications (312) authorized to execute in the first partition (310).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF PREFERRED EMBODIMENTS

The purpose of this invention is to present a balance between the needs of law enforcement to gain access to devices when given a court order or other legitimate authority, and the needs of individuals and corporations to protect their security from accidental or intentional misuse of the access provided to law enforcement. The invention presented provides the user of a device a partition in the device to execute applications for which the user can conduct financial transactions, handle sensitive corporate information, or other approved security uses. Law enforcement is never given access to this partition. There is another partition in which the user can execute any software. In this second partition, law enforcement can get access through use of a system that assures that any access that law enforcement obtains is recorded in a secure audit record.

Definitions

The following terms have the following meanings throughout the remainder of the present specification, including claims.

"Trusted Computing Base" of a protected partition is the set of firmware and software that is critical to the security of the protected partition.

"Protected Data" of a protected application in a protected partition is any data which the application chooses to keep private from access from outside the protected partition, and also any data or software used by the application for which the application wants assurance that the data or software is not modified without detection of such modification.

An "external entity" is an entity other than a "user" of the device. Both an "Authorized External Access Entity" and an "Access Protected Approval Entity" are external entities.

Preferred Embodiments

Figure 1:
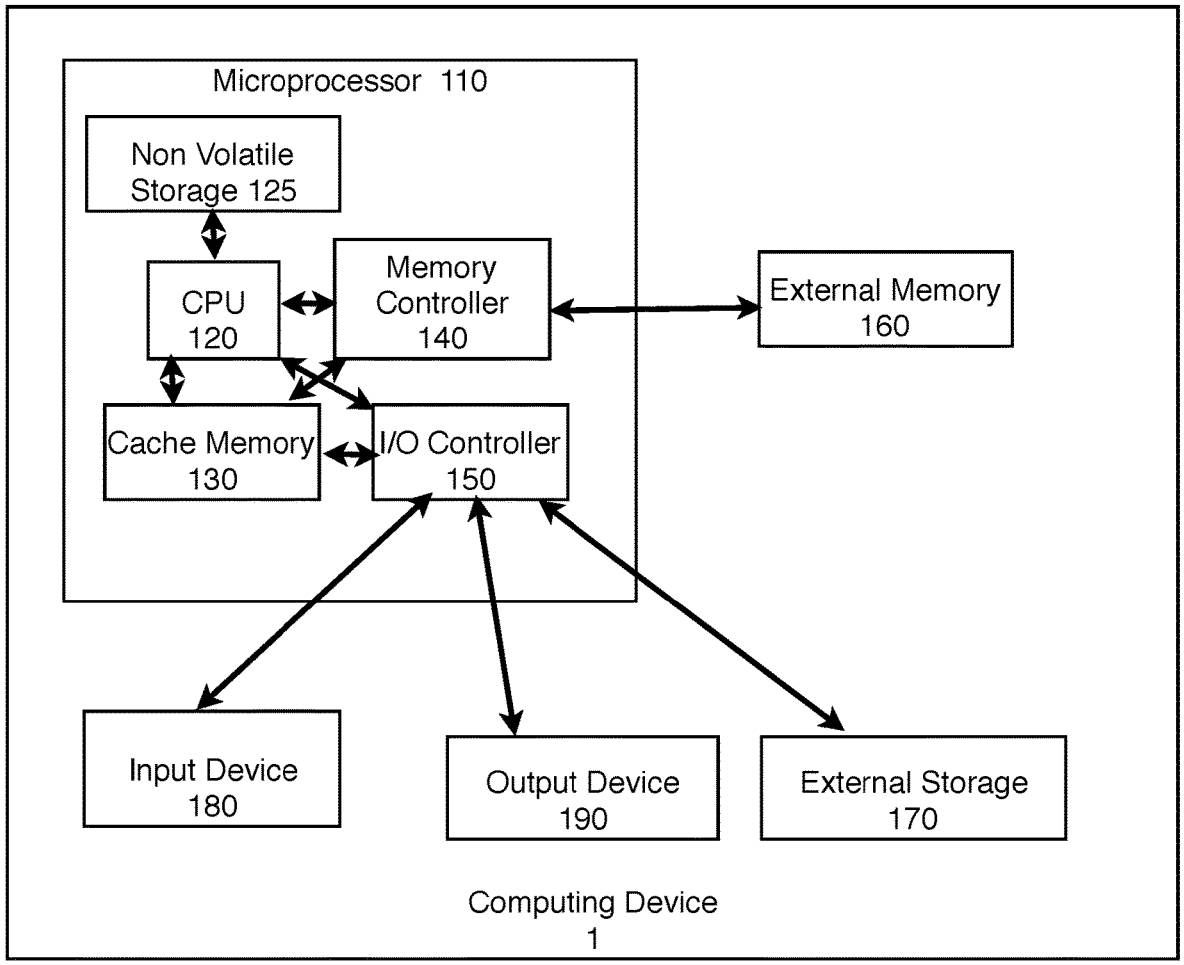
FIG. 1 is an illustration of a computing device 1 that can be used in conjunction with the present application.

FIG. 1 illustrates a system according to some embodiments. Computing device 1 may be a hand held smart phone, a tablet, a laptop, a desktop, or a server. The computing device 1 has one or more microprocessors. Each microprocessor may comprise a CPU 120 to carry out the basic instructions of a computer program, cache memory 130 to store instructions and data inside the microprocessor, a memory controller 140 to access memory 160 that is external to the microprocessor 110 and an I/O Controller 150 to access other resources on the device, such as external non-volatile storage 170, input devices 180, and output devices 190. In some embodiments of the system, there are multiple microprocessors 110 in the device. In some embodiments of the system, some of the microprocessors 110 serve specific purposes, such as a graphics microprocessor 110.

Figure 2:
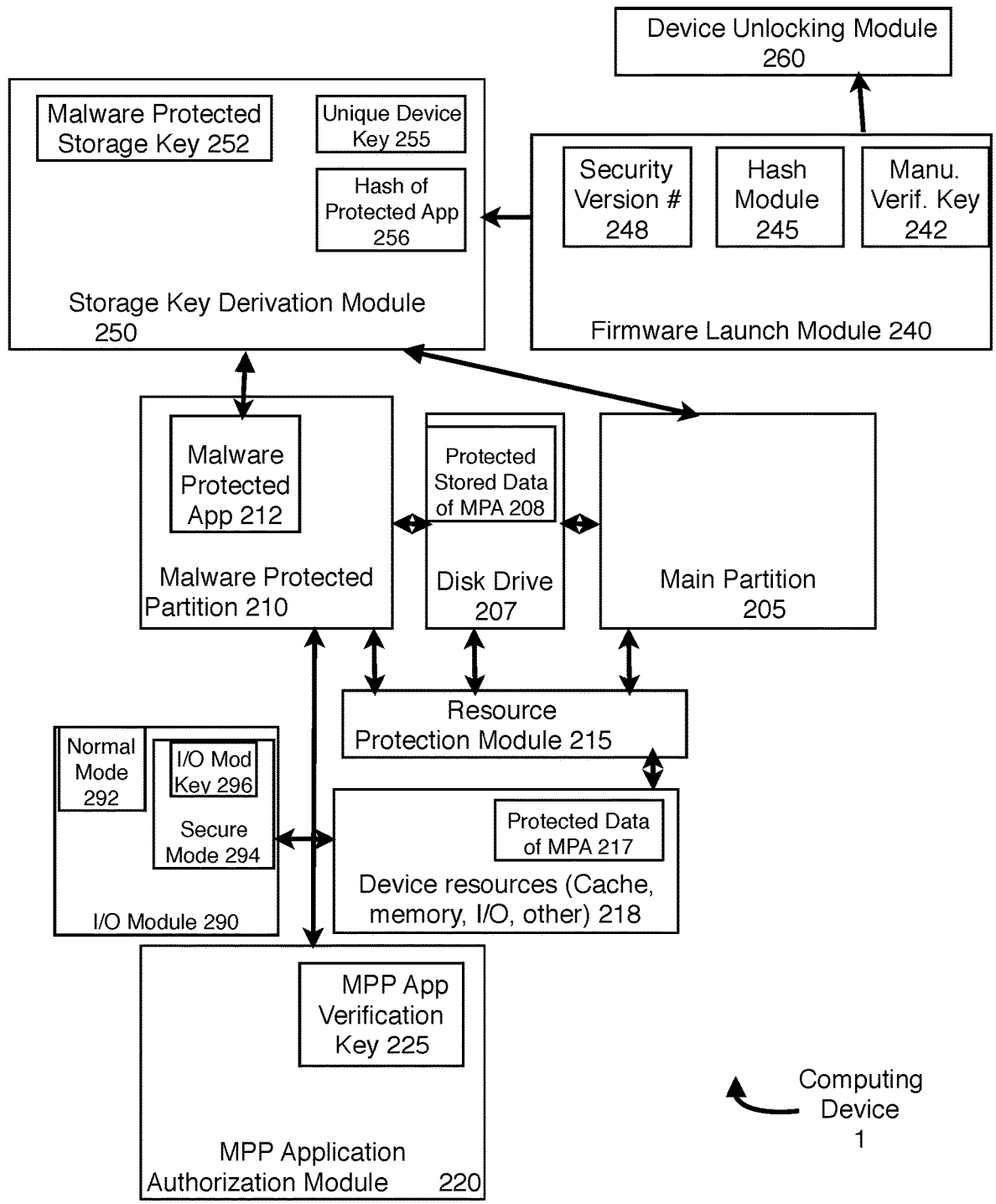
FIG. 2 is an illustration of a computing device 1 which incorporates a malware protected partition 210.

FIG. 2 illustrates an embodiment of the system, in which the computing device 1 includes a Main Partition 205, which executes much of the functionality of the system. In some embodiments, there is a Malware Protected Partition 210 for executing applications 212, using resources 217 and storing data 208 with protection from any malware that has infected the main partition 205. In some embodiments, there are multiple Malware Protected Partitions 210 with each having protection from malware that has infected the Main Partition 205 and other Malware Protected Partitions 210.

In some embodiments, during the manufacturing of the device 1, a Unique Device Key 255 is generated randomly and stored in nonvolatile storage 125 within the device 1. An Application Verification Key 225 is provided to the device 1 manufacturer and also placed in nonvolatile storage 125 within the device 1.

Within the device, there are two partitions for executing applications, a Mam Partition 205 and a Malware Protected Partition 210. The two partitions 205, 210 share some device 1 resources 218, which may include access to common input devices 180, output to common display devices 190, and system memory 125, 130, 160, 170. There is a Resource Protection Module 215 that allows applications 212 in the Malware Protected Partition 210 to use data 217 (Protected Data of Malware Protected Application 212) from device 1 resources that cannot be viewed or modified by any software in the Main Partition 205, and allows applications in the Malware Protected Partition 210 to execute instructions that cannot be modified by any software in the Main Partition 205.

In some embodiments, there may be two microprocessors 110 on the device 1, wherein the main partition 205 may include all of the applications that execute on one microprocessor 110, and the malware protected partition 210 may include all of the applications that execute on another microprocessor. In another embodiment, the main partition 205 may comprise a normal OS and all of the applications running on that OS, and the Malware Protected Partition 210 may comprise a secure OS and all of the applications running on that OS. In another case, the Malware Protected Partition 210 may be just a set of software, and the Main Partition 205 may be all other software in the system. The design of the Resource Protection Module 215 is different in these three embodiments, and may be implemented as a set of modules in different portions of the device 1.

The Firmware Launch Module 240 handles the launching of firmware on the microprocessor 110 that executes the application in the malware protected partition 210, and is in the trusted computing base of the protected partition 210. In some embodiments, there is a Manufacturers Verification Key 242 which is accessible to the Firmware Launch Module 240. The Manufacturers Verification Key 242 is the public portion of a public/private pair of keys, the private key in the pair being a Manufacturers Signature Key which the manufacturer securely maintains in their facility and uses for digitally signing firmware. In some embodiments, the firmware that is signed has a Security Version Number 248 which is assigned by the manufacturer. The Hash Module 245 computes a cryptographic hash of the firmware. The Security Version Number 248 is passed to the Storage Key Derivation Module 250. The Storage Key Derivation Module 250 computes a Malware Protected Storage Key 252 as the output of a Pseudo Random Function, with input including the Security Version Number 248 of the Firmware and the Unique Device Key 255. In some embodiments, a cryptographic hash 256 of an application 212 in the Malware Protected Partition 210 is computed by the Storage Key Derivation Module 250 for use as an additional input into the Pseudo Random Function for computing the Malware Protected Storage Key 252. In some embodiments, this storage key 252 is used by the application 212 in the Malware protected partition 210 for encrypting data for storing in permanent storage 208, such as a disk drive 207. In some embodiments, there are multiple firmware and software segments in the trusted computing base of the Malware Protected Partition 210 that are verified. In some embodiments, the Security Version Numbers 248 of multiple firmware and software segments are provided to the Storage Key Derivation Module 250 for use as input to a Pseudo Random Function for producing the Malware Protected Storage Key 252. In some embodiments, the Hashes of multiple firmware and software segments used in Device 1 for providing protection for a Malware Protected App 212, and Protected Data 208, 217 of a Malware Protected App 212 are provided to the Storage Key Derivation Module 250 for use as input to a Pseudo Random Function for producing the Malware Protected Storage Key 252.

In some embodiments, a Malware Protected Application 212 in Malware Protected Partition 210 has data that it wants to keep secret from the Main Partition 205, and for which it wants assurance that it can detect any modification to that data. In some embodiments, this is accomplished by having the Malware Protected Application 212 use the Malware Protected Storage Key 252 to cryptographically protect the data secrecy and integrity when the data is stored in Protected Stored Data of Malware Protected App 208 in the Disk Drive 207.

The embodiments described in FIGS. 1 and 2 allow the Malware Protected Application 212 to have Malware Protected Data 208, 217 kept from the Main Partition 205, that is data which the Malware Protected Application 212 keeps private from access from the Main Partition 205, and also data and software used by the Malware Protected Application 212 with assurance that the data and software are not modified without detection.

In some embodiments, the Device 1 manufacturer inserts a Malware Protected Partition App Verification Key 225 into the Device 1 during manufacturing. This Key 225 is used for approving the applications 212 that can execute in the Malware Protected Partition 210. In some embodiments, software launched in the Malware Protected Partition 210 may require an approval from the MPP Application Authorization Module 220. In some embodiments, a Malware Protected Application 212 to launch in the Malware Protected Partition 210 and a digital signature are loaded into memory 130, 160. The MPP Application Authorization Module 220 checks whether the digital signature is valid using the MPP Application Verification Key 225. The Malware Protected Application 212 is allowed to execute in the malware protected partition 210 only if it passes this signature verification check.

In some embodiments, the Resource Protection Module 215 provides protection for input and output for a Malware Protected App 212, so that input from a user is provided to the Malware Protected App 212 in a way that prevents access from any software in the Main Partition 205, and display to a screen is provided to the Malware Protected App 212 in a way that prevents access from any software in the Main Partition 205. In some embodiments, the I/O Module 290 for input or output has a normal mode 292 and a secure mode 294. In the normal mode 292, the I/O module is used by any partition 205, 210 on the platform 1. The secure mode 294 is used by a Malware Protected App 212 for protected I/O. In some embodiments, the Resource Protection Module 215 keeps data 217 transferred between the Malware Protected App 212 and the secure mode 294 of the I/O module 290 from being accessed by any software in the Main Partition 205. In some embodiments, a cryptographic key exchange is performed between a secure mode 294 of I/O module 290 and Malware Protected App 212, and cryptography is used to protect data 217 of the Malware Protected App 212 from being transferred between the Malware Protected App 212 and the secure mode 294 of the I/O Module 290. In some embodiments, this cryptographic key exchange uses a Public/Private Key pair, I/O Mod Keys 296 in the Secure Mode 294 of I/O Module 290 and a Public/Private Key pair created and used by a Malware Protected App 212.

There are existing computer architectures that meet the embodiments described in FIGS. 1 and 2. The Intel® Management Engine™ (also called the Intel® Converged Security and Management Engine™) is an embodiment of FIGS. 1 and 2 in which the Main Partition 205 is executed on one microprocessor 110 and the Malware Protected Partition 210 is executed on a different microprocessor 110. The ARM implementation of the trusted execution environment specification using ARM TrustZone® is an embodiment of FIGS. 1 and 2 in which the Main Partition 205 and the Malware Protected Partition 210 are two different modes (called Normal Mode and Secure Mode) that execute different operating systems on the same microprocessor 110. Some implementations of ARM TrustZone® may not have the functionality of the Firmware Launch Module 240 and the Storage Key Derivation Module 250. The Intel® Software Guard Extensions™ is an embodiment in which there are multiple Malware Protected Partitions 210 executing individual Malware Protected Applications 212, using the same operating systems and processors as the Main Partition 205.

One reason that the embodiment in FIGS. 1 and 2 does not meet the requirements for the device 1 in the invention described in this patent application is that the device 1 manufacturer could release a version of the trusted computing base of the Malware Protected Partition 210 that would reduce the security barriers between the Main Partition 205 and the Malware Protected Partition 210, and give this version the same Security Version Number 248 as the previous version, so that the Malware Protected Storage Key 252 would be the same with these two different versions of the firmware.

Another reason that the embodiment in FIGS. 1 and 2 does not meet the requirements for the device 1 in the invention described in this application is that the manufacturer is the entity that approves Malware Protected Applications 212 for execution in the Malware Protected Partition 210. There may be applications for which a manufacturer may want to allow a user to execute and be protected from malware, but for which a law enforcement entity may have a legitimate need to access.

Figure 3:
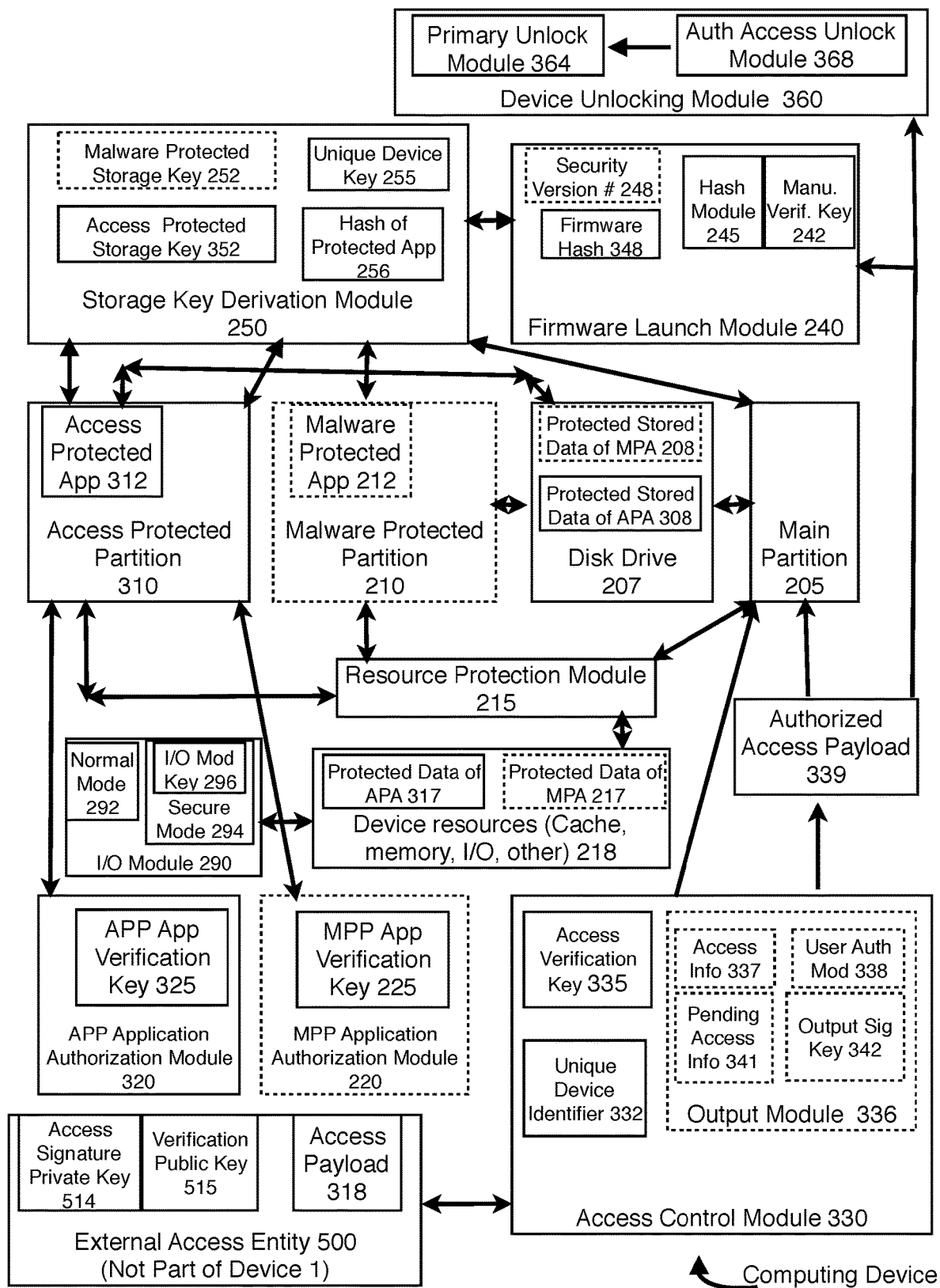
FIG. 3 is an illustration of a computing device 1 which incorporates a malware protected partition 210, and in addition incorporates an access protected partition 310 and an access control module 330.

Thus, we introduce the embodiment in FIG. 3 to address these issues.

FIG. 3 describes an example embodiment of the current invention .In some embodiments, there are one or more Malware Protected Partitions 210 and one or more Access Protected Partitions 310. The embodiment of each Malware Protected Partition 210 shown in FIG. 3 is the same as described in FIG. 2. In some embodiments, there are multiple Access Protected Partitions 310.

In some embodiments, during the manufacturing of the device 1, a Unique Device Key 255 is generated randomly and stored in nonvolatile storage 125 within the device 1. In some embodiments, there may be multiple Unique Device Keys 255, wherein some Unique Device Keys 255 are used for deriving storage keys 252, 352 for some partitions 210, 310, and other Unique Device Keys 255 used for deriving storage keys 252, 352 for other partitions 210, 310. An Access Protected Partition Application Verification Key 325, and an Access Verification Key 335 are provided to the device 1 manufacturer and also placed in nonvolatile storage 125 within the device 1.

Within the device 1, there are at least two partitions for executing applications, a main partition 205 and an Access Protected Partition 310. In some embodiments, there may be multiple Access Protected Partitions 310. The Main Partition 205 and each Access Protected Partition 310 share some device resources 218 which may include access to common input devices 180, output to common display devices 190, and system memory 125, 130, 160, 170. There is a Resource Protection Module 215 that allows an Access Protected Application 312 in the Access Protected Partition 310 to use data 317 (Protected Data of Access Protected Application 312) from device 1 resources that cannot be viewed or modified by any software in the Main Partition 205 or in the Malware Protected Partition 210, and allows an Access Protected Application 312 in the Access Protected Partition 310 to execute instructions that cannot be modified (without detection) by any software in the Main Partition 205 or in the Malware Protected Partition 210. In some embodiments, there may be multiple Access Protected Applications 312 in an Access Protected Partition 310.

In some embodiments, there may be two microprocessors 110 on the device 1, wherein the main partition 305 may include all of the applications that execute on one microprocessor 110, and the Access Protected Partition 310 may include all of the applications that execute on another microprocessor 110. In another embodiment, the main partition 305 may consist a normal OS and all of the applications running on that OS, and the Access Protected Partition 310 may consist of a secure OS and all of the applications running on that OS. In another case, the Access Protected Partition 310 may be just a set of software, and the Main Partition 305 may be all other software in the system. The design of the Resource Protection Module 215 is different in these three embodiments, and may be implemented as a set of modules in different portions of the device 1.

The Firmware Launch Module 240 handles the launching of any firmware on the microprocessor 110 that executes the software in the Access Protected Partition 310, and is in the trusted computing base of the protected partition. The Hash Module 245 computes a cryptographic hash for each piece of the firmware in the trusted computing base of the Access Protected Partition 310. The resulting Hash 348 after each piece of the firmware has been hashed together is passed to the Storage Key Derivation Module 250. The Storage Key Derivation Module 250 computes an Access Protected Storage Key 352 as the output of a Pseudo Random Function, with input including the Hash 348 of the Firmware and the Unique Device Key 255. A cryptographic hash 258 of an application 312 in the Access Protected Partition 310 is computed by the Storage Key Derivation Module 250 for use as an additional input into the Pseudo Random Function for computing the Access Protected Storage Key 252. In an embodiment with multiple Access Protected Partitions 310, partitions 310 executing different applications 312 will receive different Access Protected Storage Keys 352, since the hash 256 of the application 312, and thus the input to the Pseudo Random Function will be different. In one embodiment, this storage key 352 is used by the Access Protected Partition 310 for encrypting data before storing the data in permanent storage 308, such as a disk drive 207. In some embodiments, there are multiple firmware and software segments in the trusted computing base of the Access Protected Partition 310 that are verified. In some embodiments, the Hashes of multiple firmware and software segments are used in Device 1 for providing protection for an Access Protected App 312; and Protected Data 308, 317 of an Access Protected App 312 are provided to the Storage Key Derivation Module 250 for use as input to a Pseudo Random Function for producing the Access Protected Storage Key 352.

In some embodiments, an Access Protected Application 312 in Access Protected Partition 310 has data that it wants to keep secret from the Main Partition 205, and for which it wants assurance that it can detect any modification to that data. In some embodiments, this is accomplished by having the Access Protected Application 312 use the Access Protected Storage Key 352 to cryptographically protect the data secrecy and integrity when the data is stored in Protected Stored Data of Access Protected App 308 in the Disk Drive 207.

In some embodiments, the Resource Protection Module 215 provides protection for input and output for an Access Protected App 312, so that input from a user is provided to the Access Protected App 312 in a way that prevents access from any software in the Main Partition 205 or the Malware Protected Partition 210; and display to a screen is provided to the Access Protected App 312 in a way that prevents access from any software in the Main Partition 205. In some embodiments, the I/O Module 290 for input or output has a normal mode 292 and a secure mode 294. In the normal mode 292, the I/O module is used by any partition 205, 210, 310 on the platform 1. The secure mode 294 is used by an Access Protected App 312 for protected I/O. In some embodiments, the Resource Protection Module 215 keeps data 317 transferred between an Access Protected App 312 and the secure mode 294 of the I/O module 290 from being accessed by any software in the Main Partition 205. In some embodiments, a cryptographic key exchange is performed between secure mode 294 of I/O module 290 and an Access Protected App 312 and cryptography is used to protect data 317 of an Access Protected App 312 being transferred between an Access Protected App 312 and the secure mode of the I/O Module 290. In some embodiments, this cryptographic key exchange uses a Public/Private Key pair, I/O Mod Keys 296 in the Secure Mode 294 of an I/O Module 290, and a Public/Private Key pair created and used by an Access Protected App 312.

It is useful to note that the Protected Stored Data of Access Protection Application 308 stored in Disk Drive 207 and encrypted with the Access Protected Storage Key 352 will be inaccessible to any external party, including the Device 1 manufacturer who could release an alternate version of firmware or software for the Device 1.

Software launched in the Access Protected Partition 310 requires an approval from the Access Protected Partition Application Authorization Module 320. In some embodiments, an Access Protected Application 312 to launch in the Access Protected Partition 310 and a digital signature are loaded into memory. The APP Application Authorization Module 320 checks whether the digital signature is valid using the APP Application Verification Key 325. The Access Protected Application 312 is allowed to execute in the Access Protected Partition 310 only if it passes this signature verification check.

Examples of Access Protected Applications 312 approved for executing in an Access Protected Partition 310 include software that communicates with some institution doing communications that are unlikely to be of primary interest to Law Enforcement. If Law Enforcement did need access, they could do that through the institution. Example institutions include financial institutions, health record institutions, and corporations regarding their communications with employees.

Figure 4:
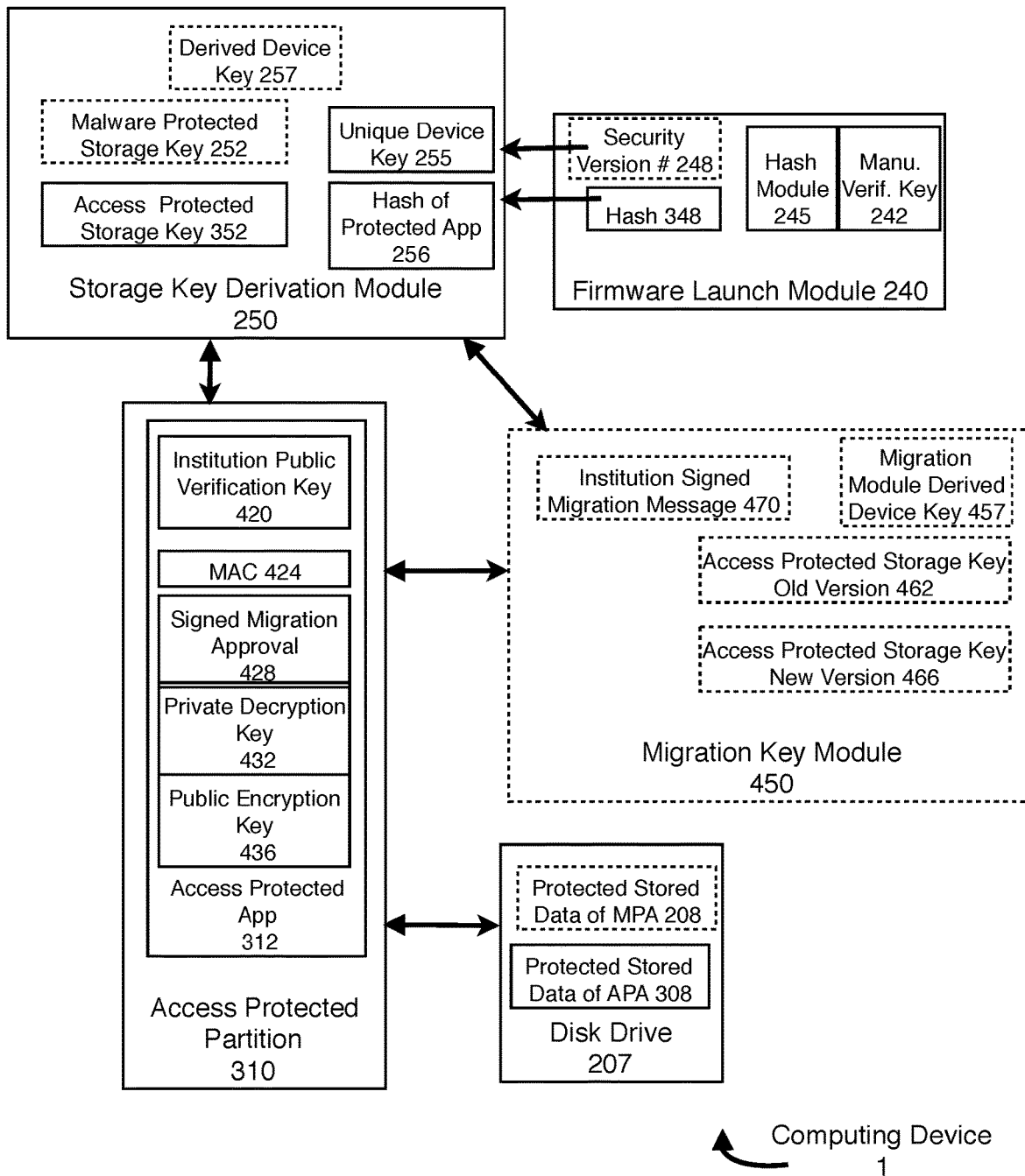
FIG. 4 is an illustration of more detail of some of the modules 240, 250, 310, 450, 207 in the illustration in FIG. 3.

FIG. 4 describes an embodiment of the invention in which an Access Protected Application 312 in an Access Protected Partition 310 is used to communicate securely with an Institution. FIG. 4 describes additional optional functionality in the modules of the Firmware Launch Module 240, the Storage Key Derivation Module 250, and the Access Protected Application 312 from FIG. 3. The Institution creates a digital signature public/private key pair, an Institution Public Verification Key 420, and an institution Private Signature Key, which the Institution protects and uses in their own facility. The Institution Public Verification Key 420 is placed in the software of the Access Protected Application 312, and is thus part of the hash of the Access Protected Application 312 sent to the Storage Key Derivation Module 250 for input in computing the Access Protected Storage Key 352.

In some embodiments, an attestation is required of the software in the Access Protected Application 312, and the trusted computing base of the Access Protected Partition 310. This is provided using the same modules and methods as prior art uses for providing attestation to Malware Protected Partitions. In some embodiments, the Access Protected Application 312 creates a Public/Private key pair for encryption, keeps the Private Decryption Key 432 secret, and sends the Public Encryption Key 436 to the Institution as part of an attestation so that the Institution knows the hash of firmware and software in the Trusted Computing Base of the Access Protected Partition 310 and the software in the Access Protected App 312 holding the Private Decryption Key 432. The Institution then uses this key 432 for secure communication with the Access Protected Application 312.

In some embodiments, there is a desire to update some of the firmware and software in the trusted computing base of the Access Protected Partition 310. As described above, after such a change to the firmware, the Access Protected Storage Key 352 will be different, and thus the Access Protected Application 312 cannot get to previously Protected Data 309 encrypted with the previous Access Protected Storage Key 352. In some embodiments, the Institution approves the change in the trusted computing base, and approves that it is safe to migrate the Protected Data 308 of the Access Protected Application 312 from the previous version of the Firmware and Software in the trusted computing base of the Access Protected Partition 310 to the new version. FIG. 4 describes an embodiment of the capability to provide this approved migration.

To explain, suppose that the Device 1 is currently using version 4 of the Firmware and Software in the Trusted Computing Base of the Access Protected Partition 310. TCB-v4 denotes version 4 of the Firmware and Software in the Trusted Computing Base of the Access Protected Partition 310. TCB-v5 denotes version 5 of the Firmware and Software in the Trusted Computing Base of the Access Protected Partition 310. When the Device launches with TCB-v4, let APSK-v4 denote the Access Protected Storage Key 352 that is generated by the Storage Key Derivation Module 250 and provided to the Access Protected Application 312. Similarly, when the Device launches with TCB-v5, let APSK-v5 denote the Access Protected Storage Key 352 that is generated by the Storage Key Derivation Module 250 and provided to the Access Protected Application 312. The Institution signifies its approval for migrating Protected Data 308 in TCB-v4 to TCB-v5 by producing a Signed Migration Approval 428 by signing {Approve for Migration, Hash(TCB-v4), Hash(TCB-v5)} with the Institution Private Signature Key, where the Hash(TCB-v4) is computed in an identical computation to the method used by Firmware Launch Module 240 and the Storage Key Derivation Module 250 to compute the Hash(TCB-v4) when TCB-v4 is launched on the device. Similarly for TCB-v5. The Signed Migration Approval 428 is provided to the Access Protected Application 312. The Signed Migration Approval 428 is not a secret value, and is stored unencrypted. When the device is launched with TCB-v4, the Access Protected Application 312 computes a cryptographic MAC 424 of the Institution Public Verification Key 420, and APSK-v4. In one embodiment, this cryptographic MAC 424 is computed as MAC 424=SHA3(APSK-v4, Institution Public Verification Key 420). This MAC 424 is not a secret value, and so the Access Protected Application 312 stores the MAC 424 unencrypted.

When the device 1 is launched with TCB-v5, the Storage Key Derivation Module 250 computes APSK-v5 as the Access Protected Storage Key 352 provided to the Access Protected Application 312. The Access Protected Application 312 provides Institution Public Verification Key 420, H=Hash(TCB-v4), MAC 424 and Signed Migration Approval 428 to the Storage Key Derivation Module 250. The Storage Key Derivation Module 250 takes the input H, and computes the APSK-v4 using H as the Hash(TCB-v4). It then computes SHA3(APSK-v4, Institution Public Verification Key 420) and checks that this matches MAC 424 provided by the Access Protected Application 312. It then uses the Institution Public Verification Key 420 to check the digital signature in Signed Migration Approval 428. If these checks all pass, the Storage Key Derivation Module 250 encrypts APSK-v4 using APSK-v5 as the encryption key, and provides that encrypted value to the Access Protected Application 312. The Access Protected Application 312 then determines the value of APSK-v4 by decrypting with APSK-v5. In another embodiment, the Storage Key Derivation Module 250 provides the value APSK-v4 to the Access Protected Application 312 directly.

In some embodiments, the computation of the Access Protected Storage Key 352 is done in a sequence of steps, because there are multiple firmware and software segments in the trusted computing base of the Access Protected Partition 310. In some embodiments, the hash of a first firmware segment, Hash(Firmware Segment 1) 348 is provided to the Storage Key Derivation Module 250, which then computes Derived Device Key 257=PRF(Unique Device Key 255, Hash(Firmware Segment 1) 348). The Firmware Launch Module 240 may receive another Firmware Segment 2. The Firmware Launch Module 240 computes Hash(Firmware Segment 2) 348, which is provided to the Storage Key Derivation Module 250. The Storage Key Derivation Module 250 computes a new Derived Device Key 257←PRF(Derived Device Key 257, Hash(Firmware Segment 2) 348). This can be repeated for each additional firmware segment. In some instances, the Firmware Launch Module 240 may be provided a segment of software, which it hashes and provides the Hash 348 to the Storage Key Derivation Module 250 for further Derived Device Key 250 derivation computation. In this embodiment, after the Storage Key Derivation Module 250 is provided with the software in the Access Protected Application 312, it computes Access Protected Storage Key 352=PRF(Derived Device Key 257, Hash(Software in Access Protected Application 312)). In this embodiment, a Migration Key Module 450 is used to provide for the approved migration of an Access Protected Storage Key 352 computed from one version of firmware and software to another version. In some embodiments, for security purposes, the Migration Key Module 450 is executed with no updateable firmware or software in its trusted computing base. The Migration Key Module 450 has access to the Unique Device Key 255. Continue the example of above of migrating the Access Protected Storage Key 352 from version 4 (APSK-v4) to version 5 (APSK-v5). The Migration Key Module 450 is provided with the Hash of each firmware and software segment used in the key derivation of the derived device key 257, for version 4, namely, Hash(Firmware Segment 1-v4), Hash(Firmware Segment 1-v5), etc. and the Hash(Software in Access Protected Application-v4 312). Similarly, the Migration Key Module 450 is provided with the Hash of each firmware and software segment used in the key derivation of the derived device key 257, for version 4, namely, Hash(Firmware Segment 1-v4), Hash(Firmware Segment 1-v5), etc. and the Hash(Software in Access Protected Application-v5 312). The Migration Key Module 450 is also provided with the Institution Public Verification Key 420, and the MAC 424 of the Institution Public Verification Key 420, and APSK-v4. In this embodiment, the Institution digitally signs with the Institution Private Signature Key a message {Approve for Migration; From TCB, Hash(Firmware Segment 1-v4), Hash(Firmware Segment 2-v4), . . . , Hash(Software in Access Protected Application-v4); To TCB, Hash( Firm ware Segment 1-v5), Hash(Firmware Segment 2-v5), . . . , Hash(Software in Access Protected Application-v5)}. This signed message is also provided to the Migration Key Module 450. The Migration Key Module 450 computes the key derivation sequence for v4, by using the values provided in the signed message from the Institution to compute Migration Module Derived Device Key 457=PRF(Unique Device Key 255, Hash(Firmware Segment 1-v4)), then computing a new Migration Module Derived Device Key 457←PRF(Derived Device Key 457, Hash(Firmware Segment 2-v4)). The Migration Key Module 450 repeats this for each additional firmware segment for v4 provided in the Institution signed message. Module 450 computes Access Protected Storage Key Old Version 462=PRF(Derived Device Key 457, Hash (Software in Access Protected Application)). The Migration Key Module 450 stores the Access Protected Storage Key Old Version 462. The Migration Key Module 450 does the same process using the values provided in the Institution signed message for v5. Specifically, the Migration Key Module 450 computes the key derivation sequence for v5, by using the values provided in the signed message from the Institution to compute Migration Module Derived Device Key 457=PRF(Unique Device Key 255, Hash(Firmware Segment 1-v5)), then computing a new Migration Module Derived Device Key 457←PRF(Derived Device Key 457, Hash(Firmware Segment 2-v5)). The Migration Key Module 450 repeats this for each additional firmware segment for v5 provided in the Institution signed message. It computes Access Protected Storage Key New Version 466=PRF(Derived Device Key 457, Hash(Software in Access Protected Application)). The Migration Key Module 450 stores the Access Protected Storage Key Old Version 466. The Migration Key Module 450 computes MAC(Institution Public Verification Key 420, Access Protected Storage Key Old Version 462) and checks that this is equivalent to the MAC 424 provided to the Migration Key Module 450. If this check does not pass, the Migration Key Module 450 stops the computation, and erases its memory. The Migration Key Module 450 checks the signature on the Institution Signed Migration Message 470 using the Institution Public Verification Key 420. If this check does not pass, the Migration Key Module 450 stops the computation, and erases its memory. If all of the checks pass, the Migration Key Module 450 encrypts Access Protected Storage Key Old Version 452 using Access Protected Storage Key New Version 466 as the encryption key, and provides that encrypted value to the Access Protected Application 312. If all of the firmware and software segments and software in the Access Protected Application 312 that were used in the launch of the Access Protected Application 312 were the same as the hashed segments used for v5 in the Institution Signed Migration Message 470, the Access Protected Storage Key 352 provided to the Access Protected Application 312 will be the same as the Access Protected Storage Key New Version 466. The Access Protected Application 312 determines the value of Access Protected Storage Key Old Version 462 by decrypting with Access Protected Storage Key New Version 466. In another embodiment, the Storage Key Derivation Module 250 provides the value Access Protected Storage Key Old Version 462 to the Access Protected Application 312 directly.

In some embodiments, the Hash of the Access Protected Application 312 is not used in the above computations.

In some embodiments of the current invention, an authorized external party is provided with access to information processed and used by the Main Partition 205. In some embodiments, that access does not include giving the party any access to protected data 308, 317. There is an access control module 330 on the device 1 (see FIG. 3), which verifies the validity of a request to access the device 1. The Access Control Module 330 has access to a Unique Device Identifier 332 on the device 1. In some embodiments, the Unique Device Identifier 332 is a permanent identifier stored in non-volatile storage 125 on the device 1, and in other embodiments, the Unique Device Identifier 332 is a temporary identifier. The Unique Device Identifier 332 is provided to the External Access Party Device 500. The Authorized External Party Device 500 digitally signs a request for access. The request includes the Unique Device Identifier 332, and an Access Payload 318. The request is digitally signed by the Access Signature Private Key 514. The signed request is provided to the Access Control Module 330. The Access Control Module 330 checks that the signature includes the Unique Device Identifier 332, and checks the validity of the signature of the Authorized External Party using the Access Verification Key 335. If these checks pass, the Access Control Module 330 creates an Authorized Access Payload 318 which will be provided to other modules in the device 1 to enable the access requested by the signed Access Payload 318. In some embodiments, the Access Verification Public Key 335 and the Access Signature Private Key 514 are a public/private key pair of a digital signature system. In other embodiments, the Access Verification Public Key 335 is a public key of a certification authority, and the Access Signature Private Key 514 is part of a digital signature private/public key pair 514, 515, in which there is a certificate for the Verification Public Key 515 in the certificate hierarchy of the certification authority.

At this point in the disclosure, it will be further instructive to the reader to explain how existing computer architectures mentioned earlier in this patent application can be modified to meet the embodiments of the system described in FIG. 3. The existing computer architectures do not have the Access Control Module 330, so that would need to be added. Also, the existing computer architectures do not have the capability for Partition Approved Migration, so that would need to be added as well. Other specific changes are mentioned below.

The Intel® Management Engine™ (also called the Intel® Converged Security and Management Engine™) is an embodiment of FIGS. 1 and 2 in which the Main Partition 205 is executed on one microprocessor 110 and the Malware Protected Partition 210 is executed on a different microprocessor 110. To meet the embodiment described in FIG. 3, in addition to adding the Access Control Module 330, and the Partition Approved Migration, a third microprocessor 110 to execute the software in the Access Protected Partition is added to have the functionality as described above.

The ARM implementation of the trusted execution environment specification using ARM TrustZone® is an embodiment of FIGS. 1 and 2 in which the Main Partition 205 and the Malware Protected Partition 210 are two different modes (called Normal Mode and Secure Mode) that execute different operating systems on the same microprocessor 110. To meet the embodiment described in FIG. 3, in addition to adding the Access Control Module 330, and the Partition Approved Migration, a third mode to execute the software in the Access Protected Partition 310 is added to have the functionality as described above. If an implementation of ARM TrustZone® does not have the functionality of the Firmware Launch Module 240 and the Storage Key Derivation Module 250, the functionality of the Firmware Launch Module 240 and the Storage Key Derivation Module 250 are added to the implementation.

The Intel® Software Guard Extensions™ (SGX) is an embodiment in which there are multiple Malware Protected Partitions 210 executing iMalware Protected Applications 212, using the same operating systems and processors as the Main Partition 205. To meet the embodiment described in FIG. 3, in addition to adding the Access Control Module 330, and the Partition Approved Migration, a new instruction, EGETPROTECTEDKEY is added to SGX. This instruction is allowed to be executed only by enclaves executing as Access Protected Applications 312 in the Access Protected Partition 310. It is similar to the EGETKEY instruction of SGX. When EGETPROTECTEDKEY is executed, if the enclave is in the Access Protected Partition 310, it returns the result of a cryptographic computation with input the Protected Platform Storage Key and the MRENCLAVE. The enclave can then use the result of EGETPROTECTEDKEY to encrypt data for permanent storage 308. Then if the device is booted with any change to the firmware in the Trusted Computing Base of the enclave, the data 308 stored by this enclave encrypted with the result of EGETPROTECTEDKEY is available. This is the important distinction with the existing SGX architecture. For in the existing SGX architecture, if an authorized signer of firmware in the Trusted Computing Base of the enclave signed a piece of firmware that allowed access to an external party, and gave that piece of firmware the same security version number, EGETKEY would produce the same result, and the external party would obtain access that was unauthorized, specifically, access without an approval from the Access Control Module 330.

In some embodiments, the Authorized External Party has physical access to the device 1, and the device 1 is locked, with a password required to unlock it. In some embodiments, the device 1 has a Device Unlocking Module 360 which unlocks the device 1 when valid authorization is provided to the Device Unlocking Module 360. In some embodiments, the Device Unlock Module 360 produces an unlock key used to decrypt data on a disk drive 207 when valid authorization is provided to the Device Unlock Module 360. In some embodiments, the Device Unlocking Module 360 includes two modules, a Primary Unlock Module 364 which checks whether an entered password is valid, and an Authorized Access Unlock Module 368 that unlocks the device when a valid Authorized Access Payload 339 is provided to the Authorized Access Unlock Module 368. In some embodiments, the Primary Unlock Module 364 checks for a biometric of the user, or some other input from the user, such as a sweep pattern on a touch screen. In some embodiments, the Primary Unlock Module 364 gives the user a limited number of tries to enter the correct password.

In one embodiment, the Access Payload 318 contains a request to unlock the device 1, and the Authorized Access Payload 339 contains a request to the Device Unlocking Module 360 to unlock the device 1. The Authorized Access Unlock Module 368 unlocks the device 1 as a result of receiving this request. This gives the Authorized External Party access to the Main Partition 205. In another embodiment, the Authorized Access Unlock Module 368 does not unlock the device 1 directly, but sends a signal to the Primary Unlock Module 364 to allow for an unlimited number of guesses to enter a valid password of the user.

In some embodiments, a password or other authorization method is required by the Access Protected Application 312 to use some of the functionality in Access Protected Application 312. The Authorized External Party is not able to access the protected data 308 of this Access Protected Application 312 without this password, and because of the protections of the Resource Protection Module 215, and because of the encryption by the Access Protected Application 312 of the protected data 308 stored by it on the Disk Drive 207. In some embodiments, the user is recommended to use a strong password for access to an Access Protected Application 312. In some embodiments, the user is recommended to use a different password than the one which unlocks the device 1. In some embodiments, the Device Unlocking Module 360 provides a value derived from the password entered by the user to unlock the device 1 to the Access Protected Application 312, and the Access Protected Application 312 uses this value to authorize access to the Access Protected Application 312. In such an embodiment, if the user has entered the correct password at the time of unlock, the user does not need to enter a password again for access to the Protected Application 312. However, when the Device Unlocking Module 360 unlocks the device 1 because of an Authorized Access Payload 339, the Device Unlocking Module 360 does not provide a valid password to the Access Protected Application 312.

In some embodiments, the Authorized Access Payload 339 is embodied in firmware. The Access Control Module 330 provides the Authorized Access Payload 339 to the Firmware Launch Module 240 during the launch of the firmware. In some embodiments, the Firmware Launch Module 240 boots the device 1 using this firmware in the Authorized Access Payload 339. In some embodiments, the Firmware Launch Module 240 requires a digital signature verified by the Manufacturers Verification Key 242 to launch any firmware in an Authorized Access Payload 339. In some embodiments, the Firmware Launch Module 240 requires a digital signature on the firmware including the Unique Device Identifier 332 verified by the Manufacturers Verification Key 242 to launch any firmware in an Authorized Access Payload 339. The Firmware Launch Module 240 hashes the provided firmware with the Hash Module 245 and provides the resulting hash 348 to the Storage Key Derivation Module 250. The Firmware Launch Module 240 also sends the Security Version Number 248 to the Storage Key Derivation Module 250. The Access Protected Storage Key 352 is computed by the Storage Key Derivation Module 250, but it will be different from the Access Protected Storage Key 352 that was generated the last time the device 1 booted. Thus, the Protected Data 308 of the Access Protected Application 312 in the Access Protected Partition 310 will not be available. However, if the Security Version Number 248 is the same as the Security Version Number 248 the last time the device 1 booted, the Malware Protected Storage Key 252 is the same as the last time the device 1 booted. If the firmware in the Authorized Access Payload 339 had the property that it removed some of the security barriers provided by the Resource Protection Module 215, the External Access Party is able to access any protected data 208, 217 in the Malware Protected Partition 210.

In an alternate embodiment, the Authorized Access Payload 339 contains firmware which is executed on the device 1. The Firmware Launch Module 240 launches the device 1 as described above using the firmware in the Authorized Access Payload 339, but does not provide a Hash 348 to the Storage Key Derivation Module 250. In this embodiment, the Protected Data 308, 317 of the Access Protection Application 312 in the Protected Partition 310 is not available.

In some embodiments, the Authorized Access Payload 339 contains firmware which is executed on the device 1. The Firmware Launch Module 240 launches the device 1 as described above using the firmware in the Authorized Access Payload 339. The firmware in the Authorized Access Payload 339 makes a change to the Device Unlocking Module 360. In some embodiments, this change allows for an unlimited number of tries to enter the password. One potential drawback to this embodiment is that if the Authorized External Access Party is successful at guessing the password, he could then reboot the device 1 with this password. This might allow the Authorized External Access Party easy access to the Access Protected Partition 310.

In some embodiments, the Authorized Access Payload 339 contains firmware, and the device 1 has a protection mechanism that requires validation of a digital signature on the firmware before it is written to the boot section of memory 125, 160, or 170. In such an embodiment, the Authorized Access Payload 339 is given permission to be written to the boot section of memory as required.

In some embodiments, after the Access Control Module 330 has verified the validity of the access request, the access that it provides to the Authorized External Party is the ability to execute software in the Main Partition 205. In one embodiment, the Authorized Access Payload 339 contains software. The software is placed into memory 130 or 160 and that region of memory is given permission to execute with a high privilege, but no higher privilege than any other software in the Main Partition 205. It is important to note that the current invention provides protection for the user in this case. Because the software is allowed to execute only in the Main Partition 205, the Resource Protection Module 215 and the encryption of the Access Protected Application 312 for the Protected Data of Access Protected Application 308 stored in the Disk Drive 207 still keeps the software from accessing any protected data 308, 317 of the Access Protected Application 312.

In some embodiments, the Access Control Module 330 includes an Output Module 336. The Output Module is informed each time an Authorized Access Payload 339 is produced by the Access Control Module 330. Information about the Authorized Access Payload 339 is stored in Access Info 337, which is non volatile storage 125 available to the Output Module 336. In some embodiments, the Access Info 337 is the number of times that an Authorized Access Payload 339 has been produced. In some embodiments, the Access Info includes a hash chain derived from input from Authorized Access Payloads 339. In some embodiments, any information from an Authorized Access Payload 339 may not be included in real time in the Access Info 337, but may be stored temporarily in Pending Access Info 341, and added to the Access Info 337 after the passage of some specified time. In some embodiments, upon a request, the Output Module 336 provides the Access Info 337 to the Main Partition 205. In some embodiments, the Output Module 336 also provides a digital signature of the Access Info 337 using an Output Signature Key 342. In some embodiments, this signed message may also include the Unique Device Identifier 332. In some embodiments, the Output Module 336 requires a successful user authentication, including a success message from a User Authentication Module 338 before Access Info 337 is released.

Figure 9:
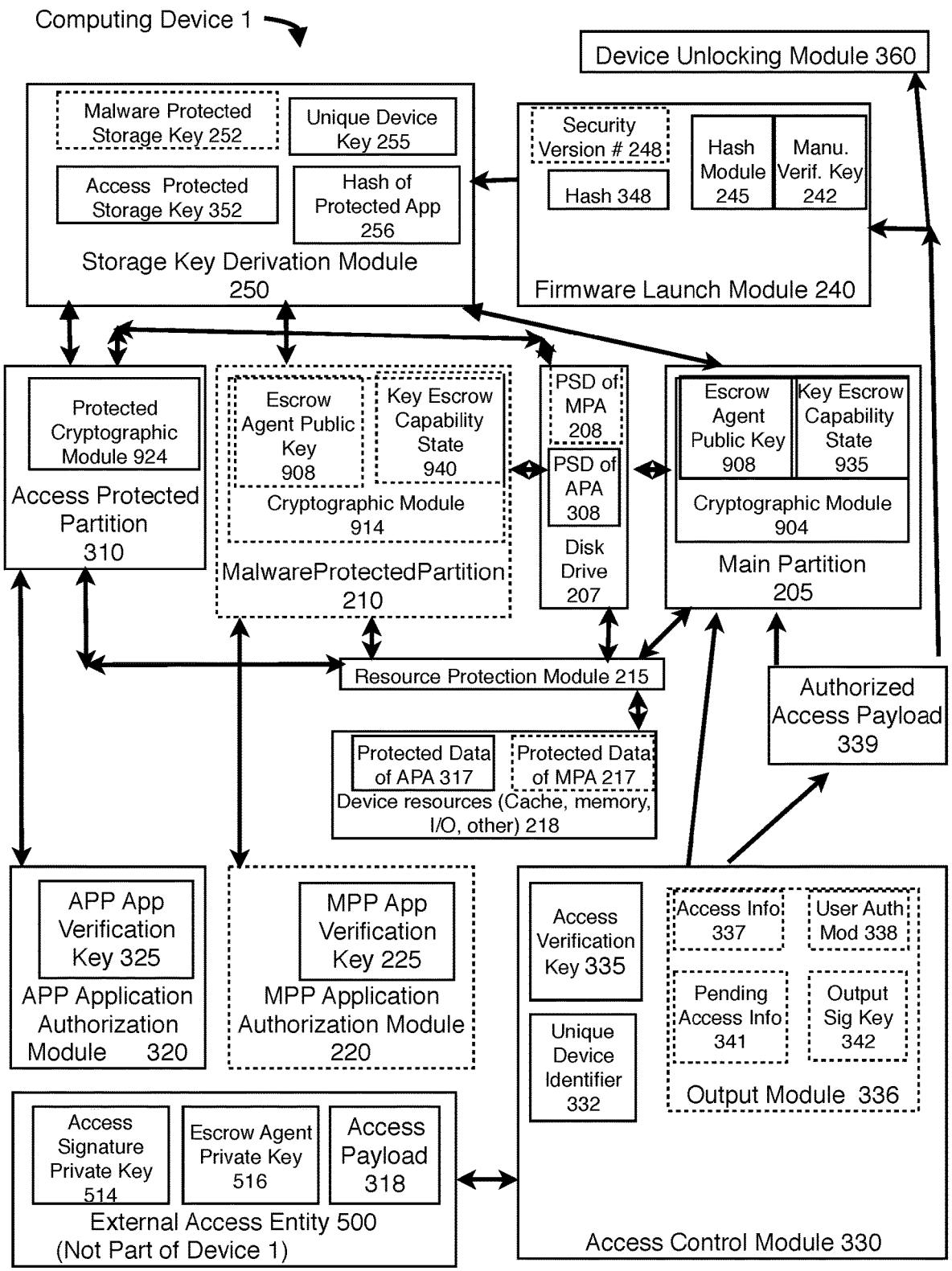
FIG. 9 is an illustration of a computing device 1 wherein the main partition 205 and the malware protection partition 210 use cryptographic modules 904, 914 which have key escrow capabilities.

In some embodiments, an Authorized External Access Party desires to view communications from the Device 1 that have been encrypted. FIG. 9 illustrates an embodiment of this capability. In some embodiments, the Main Partition 205 has access to a Cryptographic Module 904 in which keys used for encryption are subject to a key escrow system wherein the Authorized External Access Party has the capability to decrypt communications encrypted with those keys. In some embodiments, the Access Protected Application 312 is allowed to use a Protected Cryptographic Module 924 which does not have key escrow of any of the keys in the Protected Cryptographic Module 924. In some embodiments, the Cryptographic Module 904 contains an Escrow Agent Public Key 908, which is the public part of a public/private encryption/decryption key pair, where the private part of the key pair, the Escrow Agent Private Key 516, is kept in an External Access Party Device 500. For any use of an encryption key, the Cryptographic Module 904 encrypts the Encryption Key with the Escrow Agent Public Key 908, and includes this encrypted key with the encrypted information. In some embodiments, there are multiple Escrow Agent Public keys 908 in the Cryptographic Module 904. In some embodiments, an Encryption Key used by the Cryptographic Module 904 is split into multiple pieces, for example, Encryption Key=Piece1 XOR Piece2 XOR Piece3. Each Piece is encrypted with a different Escrow Agent Public key 908. All of the encrypted keys are included in the communication. FIG. 9 describes one key escrow system, but other key escrow systems could be used instead. In some embodiments, a Cryptographic Module 914 with a key escrow feature is also available to Malware Protected Partition 210. In some embodiments, the Cryptographic Module 904 does not use the key escrow capability unless there is an Authorized Access Payload 339 that makes a request for key escrow to be performed by the Cryptographic Module 304. In some embodiments, the Cryptographic Module 904 does not use the Escrow Agent Public Key 908 for computations unless there is an Authorized Access Payload 339 that makes a request for key escrow to be performed by the Cryptographic Module 904. In some embodiments, the Escrow Agent Private Key 516 may be held in a different device and possibly controlled by different administrators than the Access Signature Private Key 514. In some embodiments, the Escrow Agent Public Key 908 is placed in the computing device 1 during manufacturing of the computing device 1, thus prior to receiving a verified request to perform key escrow by the Cryptographic Module 904.

Figure 10:
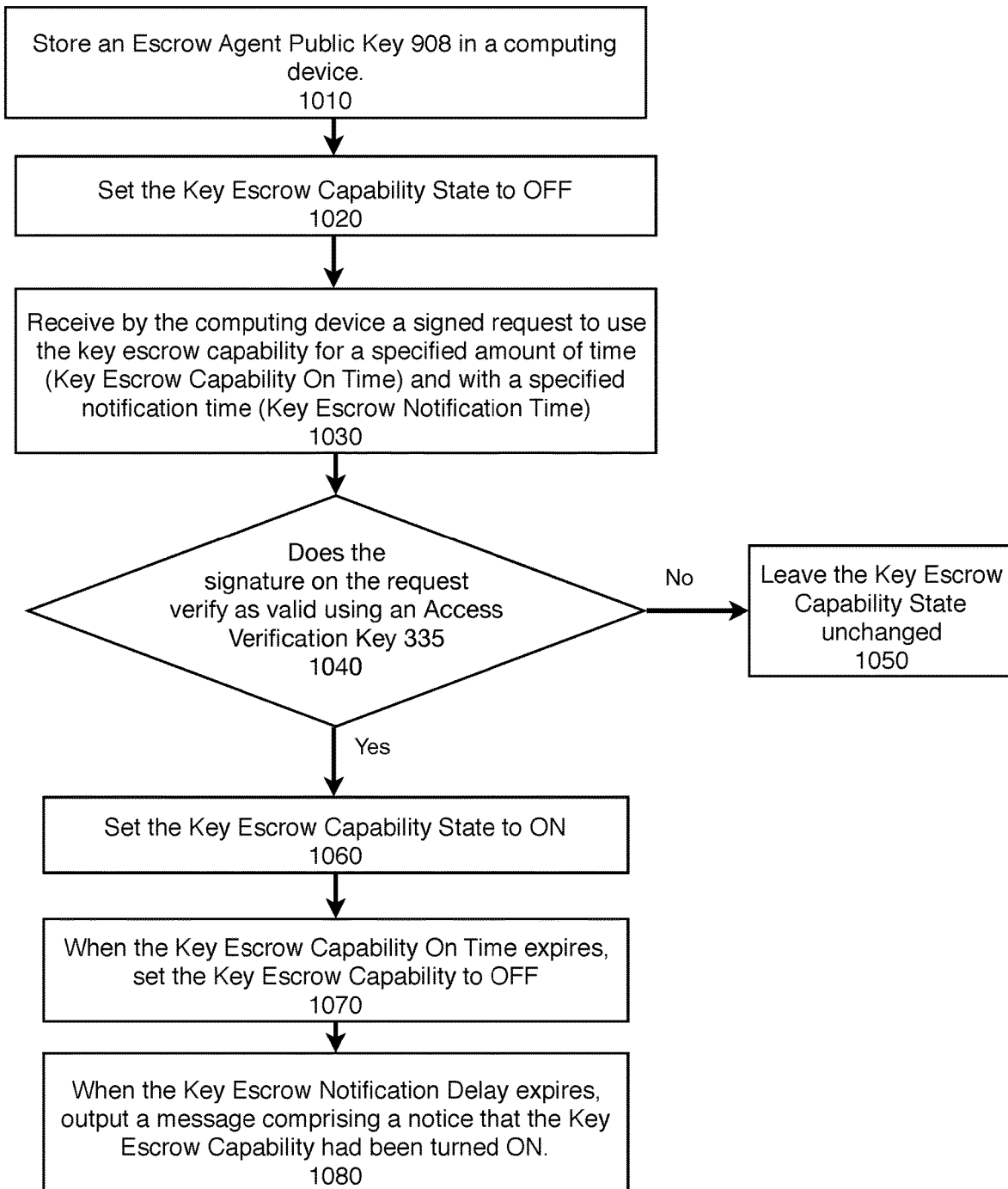
FIG. 10 is an illustration of a method for use of a key escrow capability in a computing device only when there is a verified request to use the key escrow capability.

FIG. 10 describes a method for use of a key escrow capability in a computing device only when there is a verified request to use the key escrow capability. In step 1010, an Escrow Agent Public Key 908 is stored in a Cryptographic Module 904 in a Computing Device 1. In some embodiments., the Escrow Agent Public Key 908 is stored in the Computing Device 1 during the manufacturing of the Computing Device 1. In some embodiments, the Escrow Agent Public Key 908 is stored in the Computing Device 1 at a time after the manufacturing of the Computing Device 1. In some embodiments, the Cryptographic Module 904 contains a stored variable, Key Escrow Capability State 935, which can be set to either ON or OFF. In step 1020, the initial state of the Key Escrow Capability State 935 is set to OFF. In step 1030, the computing device 1 receives a signed Key Escrow Request to turn on the key escrow capability. In some embodiments, the Key Escrow Request includes a Key Escrow Capability On Time, which indicates the amount of time (e.g., 1 month) that the key escrow capability can be used. In some embodiments, the Key Escrow Request includes a Key Escrow Notification Time (e.g., 3 months) that includes how much time can pass before the user of Computing Device 1 is notified that the key escrow capability has been turned on. In some embodiments, this signed Key Escrow Request is handled by the Access Control Module 330, as described earlier in this patent specification for handling a request for access. In some embodiments, the Key Escrow Request is a type of request for access to Computing Device 1.

In Step 1040, the Access Control Module 330 checks the validity of the signature on the Key Escrow Request using the Access Verification Key 335. If these validity checks fail, the computing device will not change the state of the Key Escrow Capability State 935, as shown in Step 1050. If these validity checks pass, the Access Control Module 330 creates an Authorized Access Payload 31, records the Key Escrow Request in the Pending Access Info 341 in the Output Module 336, records the time derived from the Key Escrow Capability On Time for when the key escrow capability is set to expire, and records the time derived from the Key Escrow Notification Time for when the user is to be notified about the key escrow capability turn on.

The Authorized Access Payload 31 comprises instructions provided by the Key Escrow Request. In some embodiments, the Authorized Access Payload 31 includes instructions to set the Key Escrow Capability State 935 to ON. The Authorized Access Payload 31 is sent to the Cryptographic Module 904. The Cryptographic Module 904 sets the Key Escrow Capability State 935 to ON as indicated in Step 1060.

Figure 11:
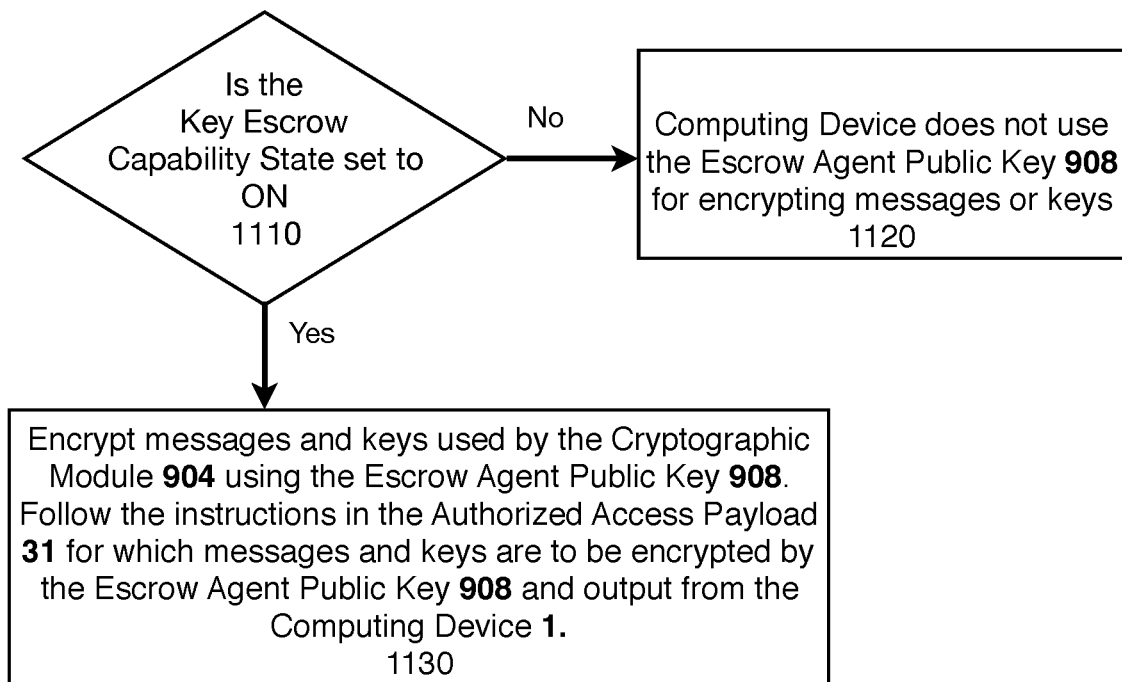
FIG. 11 is an illustration of the use of an internal state variable for controlling whether a key escrow capability is used or not.

FIG. 11 describes how the functionality of the Computing Device 1 differs depending on the outcome of a check described in Step 1110 to determine whether the Key Escrow Capability State 935 is ON or OFF. If the Key Escrow Capability State 935 is OFF, the Cryptographic Module 904 does not use the Escrow Agent Public Key 908 to encrypt any messages or keys, as indicated in Step 1120. If the Key Escrow Capability State is ON, then, as indicated in Step 1130, the Cryptographic Module 904 uses the Escrow Agent Public Key 908 for encrypting messages or keys, which are output from the Computing Device 1. In some embodiments, the Authorized Access Payload 31 includes instructions indicating which messages and keys used by the Cryptographic Module 904 are to be encrypted with the Escrow Agent Public Key 908.

As indicated in Step 1070, when the time to expire the key escrow capability arrives, the Access Control Module 330 informs the Cryptographic Module 904 to set the Key Escrow Capability State 935 to OFF.

As indicated in Step 1080, when the time arrives to notify the user that the key escrow capability has been used, the Output Module outputs a notification to the user indicating that the key escrow capability was turned on. In some embodiments, this notification comprises the time when the Key Escrow Capability State was turned ON, and when it was turned OFF. In some embodiments, this notification comprises the instructions in the Key Escrow Request for which messages and keys were to be encrypted with the Escrow Agent Public Key 908.

In some embodiments, Computing Device 1 may have multiple cryptographic modules that have a potential key escrow capability. FIG. 9 shows a Cryptographic Module 904 in the Main Partition 205, and another Cryptographic Module 914 in the Malware Protected Partition 210. In some embodiments, each such cryptographic module may have its own key escrow capability state. FIG. 9 illustrates a Key Escrow Capability State 935 in Cryptographic Module 904, and a Key Escrow Capability State 940 in Cryptographic Module 914. In some embodiments, a Key Escrow Request includes instructions to turn on one or multiple key escrow capability states in one or multiple cryptographic modules. Method for Protecting the Keys of the Access Authorities.

In an embodiment, the Access Signature Private Key 514 and the Escrow Agent Private Key 516 are in a device 500 that can provide evidence that all use of these keys 514, 516 for authorizing external access or decrypting messages can be provided to auditors. In some embodiments, an External Access Party Device 500 may have only one of the keys 514, 516. In some embodiments, the Escrow Agent Private Key 516 may be held in a different device and possibly controlled by different administrators than the Access Signature Private Key 514. In an embodiment in which the Escrow Agent Private Key 516 is held in a different device than the Access Signature Private Key 514, the methods described below may be applied to either or both devices.

An unalterable execution environment is an application in a device in which the device provides the application with a key that can encrypt data for storage, with the property that the key that is provided to the application is dependent upon all of the firmware and software in the trusted computing base of the application and the software in the application. In particular, the provided key changes if there is any change in any of the firmware and software in the trusted computing base of the application or the software in the application.

An attestable, unalterable execution environment is an unalterable execution environment in which it is possible to demonstrate to an auditor that a private key corresponding to a known public key is contained within the environment, and the cryptographic hash of all firmware and software in the trusted computing base of the environment.

Figure 5:
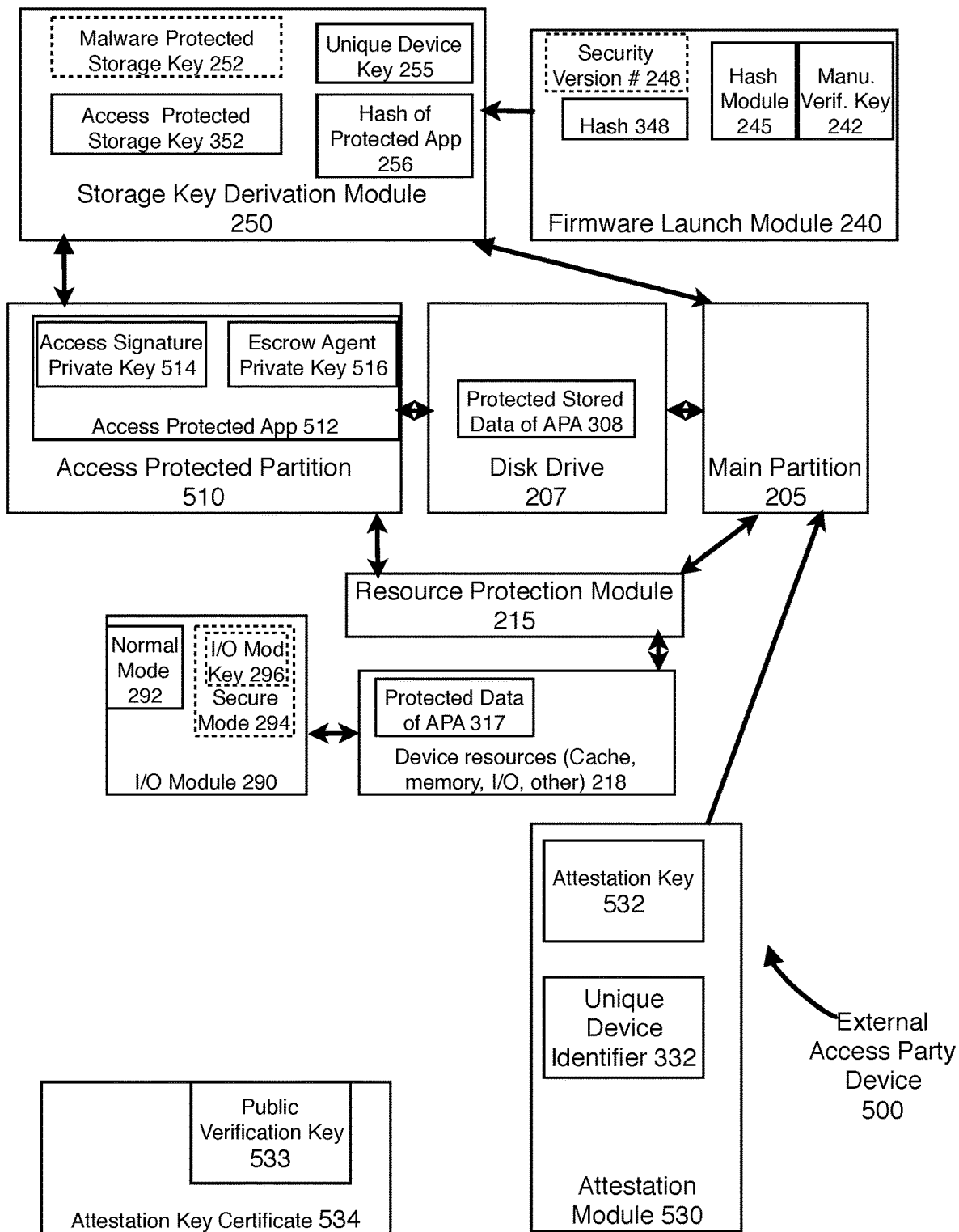
FIG. 5 is an illustration of a computing device 500 which is used by an external party for securely storing and using private keys 514, 516 which are used for external access and key escrow.

FIG. 5 describes a device 500 that is an embodiment of an attestable, unalterable execution environment. The embodiment described in FIG. 5 is similar to the embodiment described in FIG. 3, with Access Protected Partition 510 and Access Protected Application 512 in FIG. 5 corresponding to Access Protected Partition 310 and Access Protected Application 312 in FIG. 3, except that there is no Access Control Module 330, or Access Protected Partition Application Authorization Module 320, and there is an attestation module 530.

The Attestation Module 530 contains an attestation key 532. In some embodiments, the attestation key 532 is a private digital signature key of a private digital signature key 532/public verification key 533 pair. In some embodiments, there is an Attestation Key Certificate 534 issued by the device 500 manufacturer certifying that private signature key 532 corresponding to public verification key 533 is indeed held securely in a device 500 of this type made by the device 500 manufacturer. When an attestation of the Access Protected Application 512 in an Access Protected Partition 510 is requested, the Attestation Module 530 receives a firmware Hash 348 of the firmware used to launch the device, and an App Hash 256 of the Access Protected App 512. The Attestation Module 530 digitally signs a combination of Firmware Hash 348 and App Hash 256 with the Attestation Key 532. In some embodiments, there may be additional firmware and software in the trusted computing base of the Access Protected Partition 510, wherein, the hashes of this firmware and software will also be combined in the data signed by the Attestation Key 532 for this attestation.

Figure 6:
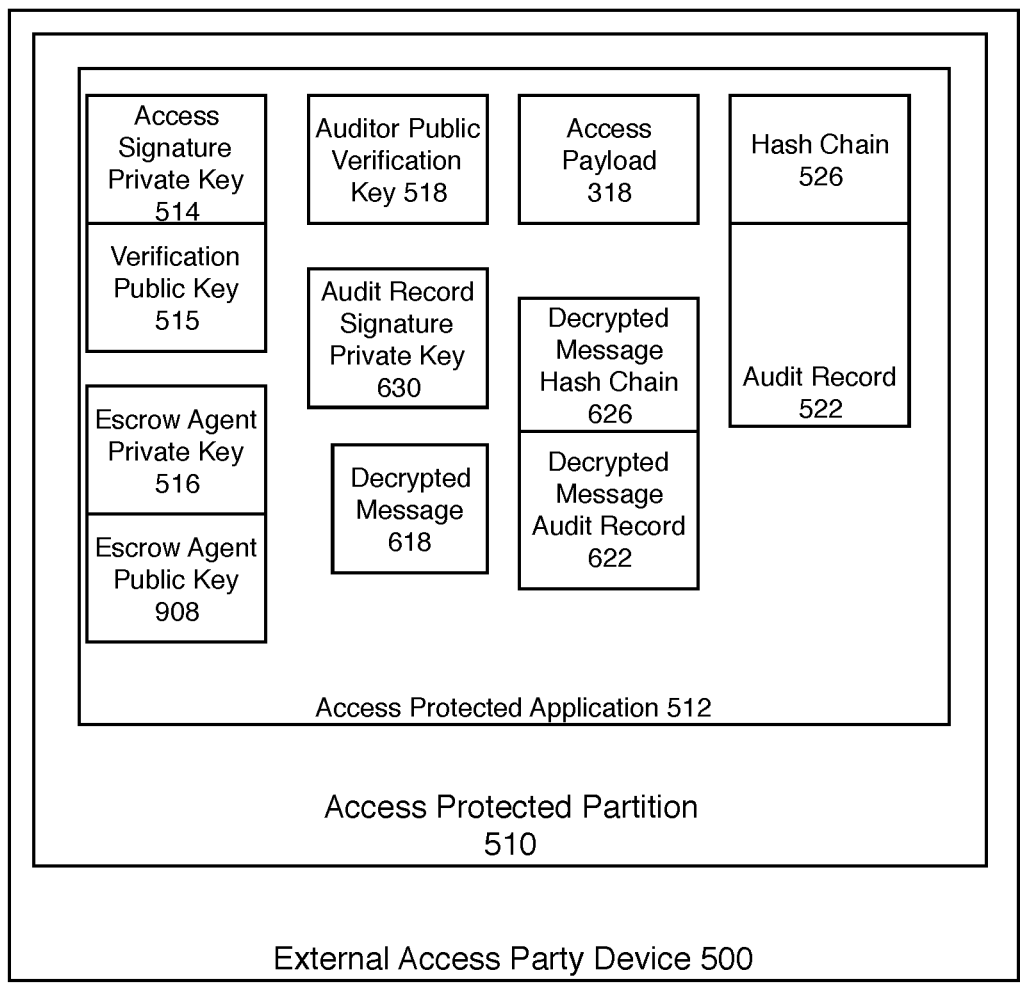
FIG. 6 is an illustration of more detail of the access protected application 512 illustrated in FIG. 5.

FIG. 6 is an expanded description of the Access Protected Application 512 in the External Access Party Device 500.

In some embodiments, an Access Signature Private Key 514 and corresponding Verification Public Key 515 (also shown in FIG. 3) are created inside the Access Protected Application 512. In some embodiments, an Escrow Agent Private Key 516 and corresponding Escrow Agent Public Key 908 (also shown in FIG. 9) are created inside the Access Protected Application 512. The Verification Public Key 515 and/or the Escrow Agent Public Key 908 are provided to the Attestation Module 530 to be included as data to the attestation to provide evidence that the Access Signature Private Key 514 and/or the Escrow Agent Private Key 516 are in an Access Protected Application 512 in an Access Protected Partition 510.

In some embodiments, an Audit Record Signature Private Key 630 and corresponding Audit Record Verification Key 518 are created inside the Access Protected Application 512. The Audit Record Verification Key 518 is provided to the Attestation Module 530 to be included as data to the attestation to provide evidence that the Audit Record Signature Private Key 630 is in a Protected Application 512.

In some embodiments, an auditor creates a auditor private signature/auditor public verification key pair on a device of his choosing. The auditor sends his Auditor Public Verification Key 518 to the External Access Party Device 500. This key 518 is inserted into the Access Protected Application 512. The Access Protected Application 512 digitally signs receipt of the Auditor Public Verification Key 518 by the Audit Record Signature Private Key 630 and provides the digital signature to the auditor. In some embodiments, the Access Signature Private Key 514 and the Audit Record Signature Private Key 630 are the same key.

In some embodiments, for every use of the Access Signature Private Key 514 to sign an Access Payload 318, the Access Protected Application 512 produces an audit record 522 which includes the Access Payload 318. In some embodiments, the audit record 522 is a hash chain, where each Signed Access Payload 318 is appended to the hash chain. In some embodiments, the Signed Access Payload 318 is appended as (New) HASH CHAIN 526=HASH (Access Payload, (Old) HASH CHAIN 526). For each Access Payload 318 that is digitally signed by the Access Signature Private Key 514, the Access Protected Application 512 creates the Audit Record 522 containing the Access Payload 318 and the (new) Hash Chain 526. In some embodiments, this Audit Record 522 is signed by the Audit Record Signature Private Key 630.

In some embodiments, for every use of the Escrow Agent Private Key 516 to produce a decrypted message 618, the Access Protected Application 512 produces a decrypted message audit record 622 which includes the decrypted message 618. In some embodiments, the decrypted message audit record 622 includes a hash chain, where the hash of each Decrypted Message 618 is appended to the hash chain. In some embodiments, the hash of the Decrypted Message 618 is appended as (New) HASH CHAIN 626=HASH (Access Payload, (Old) HASH CHAIN 626). For each Decrypted Message 618 that is decrypted by the Escrow Agent Private Key 516, the Access Protected Application 512 creates the Decrypted Message Audit Record 622 containing the Decrypted Message 618 and the (new) Hash Chain 626. In some embodiments, this Decrypted Message Audit Record 622 is signed by the Audit Record Signature Private Key 514. In some embodiments, the new Hash Chain 626 may be added to the Decrypted Message Audit Record 622 in real time, and the Decrypted Message 618 may be added to the Decrypted Message Audit Record 622 at a later time as determined by a time delay. The time delay may be dependent upon the source of the message that was decrypted. In some embodiments, the time delay is produced by having recent additions to the audit record 622 encrypted with a cryptographic key that could be broken in a reasonable amount of time with reasonable resources. Older additions to the audit record 622 are provided to the auditor in a form the auditor can read in real time.

In the following description, it is understood that the term Private Keys 514, 516 will refer to both of the Access Signature Private Key 514 and the Escrow Agent Private Key 516 if both are present in the Access Protected Application 512, or to only one of those keys if only one is present.

In some embodiments, it is desirable to protect against the possibility that an External Access Party Device 500 gets accidentally or intentionally destroyed after it has signed multiple Access Payloads 318, or decrypted messages 618 and before the Audit Records 522, 622 have been received by the Auditor. Some embodiments provide this protection by requiring the receipt of a digital signature by the Audit Record Signing Key 630 of an existing Audit Record 522, 622 by the Auditor before signing more Access Payloads 318 with the Access Signature Private Key 514 or decrypting messages 618 with the Escrow Agent Private Key 516. In some embodiments, the Access Protected Application 512 requires the auditor's digital signature of the latest Audit Record 522, 622 prior to using one of the Private Keys 514, 516. In some embodiments, the Access Protected Application 512 requires the auditor digital signature of the K'th latest Audit Record 522 for some integer K, prior to signing a new Access Payload 318. In some embodiments, the Access Protected Application 512 requires the auditor digital signature of the K'th latest Decrypted Message Audit Record 622 for some integer K, prior to decrypting any new messages to produce a new Decrypted Message 618. In some embodiments, the Access Protected Application 512 creates an Audit Record 522 containing an Access Payload 318, and requires an auditor's digital signature on that new Audit Record 522 prior to signing the Access Payload 318 with the Access Signature Private Key 514.

In some embodiments, an auditor receives a demonstration that the Private Keys 514, 516 are in an attestable, unalterable execution environment. That demonstration includes an attestation. If the attestation is done remotely, the trust that the auditor has in the demonstration is entirely dependent upon the security of the certification authority at the manufacturer. To reduce that dependence, the demonstration is performed with the auditor in physical proximity with the External Access Party Device 500. In some embodiments, the auditor performs a test to assure that the Attestation Key 532 is physically present on the device 500 in the room. The device 500 is in a platform that the auditor can physically inspect. The device 500 has at least a keyboard and some output device. Upon inspection, the auditor receives confidence that there is no other device on the platform that could be performing an attestation. In some embodiments, the auditor assures that device 500 is not connected to any other device or network, either through a wired connection or a wireless connection. The auditor provides some previously unknown value to the device 500, and requests a digital signature from that device 500 that includes that value. In some embodiments, that signature is created by the Access Signature Private Key 514. In some embodiments, that signature is created by the Attestation Key 532. The auditor checks the validity of that signature. In some embodiments, that is done by a device the auditor has with him. In alternative embodiments, the auditor makes copy of the signature and verifies it later. The auditor may also want to establish confidence that the External Access Party Device 500 is a real device of the manufacturer, and not a clone device made to look like the real device 500. In some embodiments, the auditor will supply a series of workloads to the device 500 and measures the correctness of the output of these workloads, and the time required to perform them.

In some embodiments, the auditor may ask for firmware and software that is in the trusted computing base of the Access Protected Application 512. The auditor checks the validity of that provided firmware and software by computing the hash and comparing to the hash of the trusted computing base digitally signed by the Attestation Key 532 in an attestation of the Access Protected Application 512. In some embodiments, the auditor conducts a thorough review of this firmware and software. In particular, the auditor verifies that the software that executes in the Access Protected Application 512 follows all of the requirements of the auditor, such as the requirements described for creating Audit Records 522 and following the protocols for duplicating one of the Private Keys 514, 516.

Figure 7:
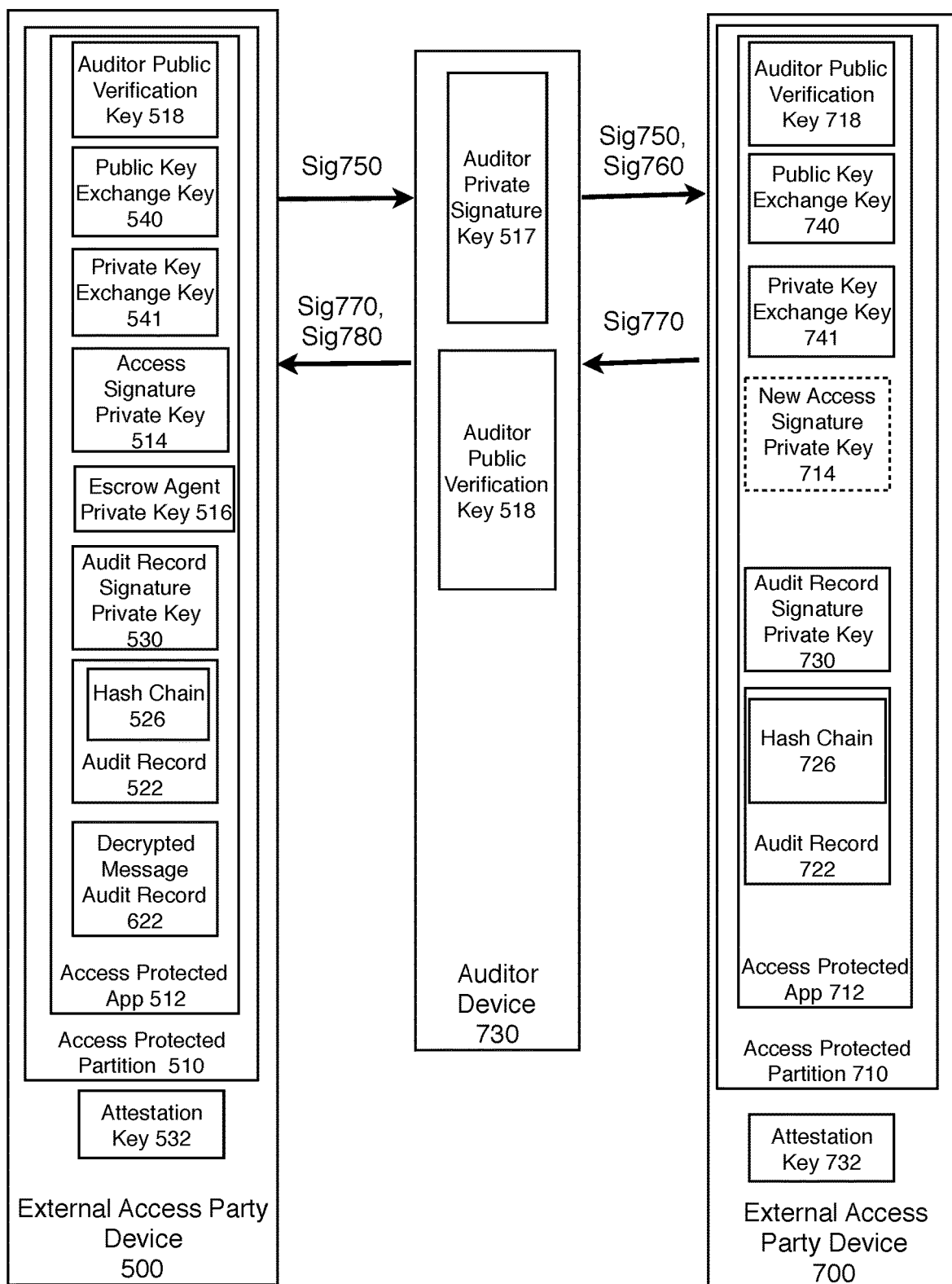
FIG. 7 is an illustration of a protocol used to transfer private keys 514, 516 from one external access party device 500 to another 700.

In some embodiments, the External Access Party desires to protect against destruction of the Private Keys 514, 516. In some embodiments, the External Access Party duplicates one of the Private Keys 514, 516 into one or more additional External Access Party Devices 700. FIG. 7 describes an embodiment for a method to duplicate one of the Private Keys 514, 516 in a manner by which the Auditor can still maintain assurance that all uses of the Private Key 514, 516 are audited even though there are multiple copies. FIG. 7 shows two External Access Party Devices, 500 and 700. Device 500 and Device 700 both have the same architecture as described in FIG. 5. Device 700 has an Access Protected Partition 710, which executes Access Protected Apps 712. The auditor checks the validity of the devices 500, 700 and that the attestation keys 532 and 732 are in these devices 500, 700 as described above. In some embodiments, the Access Protected Application 512 receives an attestation of Access Protected Application 712, and Access Protected Application 712 receives an attestation of Access Protected Application 512.

In some embodiments, Access Protected Application 512 and Access Protected Application 712 perform a cryptographically secure key exchange which is used to securely transport the Private Keys 514, 516 from Access Protected Application 512 to Access Protected Application 712, with the additional steps that the auditor digitally signs each message sent during this protocol, and each Protected Application 512 and 712 checks the signature of the auditor using Auditor Public Verification Key 518 and 718 respectively on each message received from the other Access Protected Application 512.

In one embodiment, the Auditor creates an Auditor Private Signature Key 517 and an Auditor Public Verification Key 518 in a Auditor Device 730. The Auditor Public Verification Key 518 is provided to both Access Protected Application 512 and to Access Protected Application 712. In some embodiments, different Auditor keys can be used for the Access Protected Application 512 and the Access Protected Application 712. This key 518 is inserted into the Access Protected Application 512. The Access Protected Application 512 digitally signs receipt of the Auditor Public Verification Key 518 by the Audit Record Signature Private Key 630 and provides this signature to the auditor. This key 518 is inserted into the Access Protected Application 712. The Access Protected Application 712 digitally signs receipt of the Auditor Public Verification Key 518 by the Audit Record Signature Private Key 714 and provides this signature to the auditor.

In one embodiment, Access Protected Application 512 creates a Public 540/Private 541 Key Exchange Pair, using Diffie Hellman or some similar cryptographic technique for performing a cryptographic key exchange.

In one embodiment, the Access Protected Application 512, the Auditor Device 730, and the Access Protected Application 712 participate in the following protocol. The Access Protected Application 512 creates a signature Sig750 by signing the Public Key Exchange Key 540 as part of an attestation of the Access Protected Application 512, by the Attestation Key 532. In another embodiment, the Access Protected Application 512 creates a signature Sig750 by signing the Public Key Exchange Key 540 with some other key that has already been attested to as belonging to the Access Protected Application 512.

Sig750 is sent to the Auditor Device 730. The Auditor Device 730 verifies the signature, and that the key that created the signature was either the Attestation Key 532 or another key that had previously been attested to belong to the Access Protected Application 512. If these checks verify, the Auditor Device 730 creates Sig760 by signing the Public Key Exchange Key 540 with the Auditor Private Signature Key 517. Both Sig750 and Sig760 are sent to the Access Protected Application 712.

The Access Protected Application 712 verifies the signature of the auditor on Public Key Exchange Key 540, and verifies that the key that created the signature was either the Attestation Key 532 or another key that had previously been attested to belong to the Access Protected Application 512.

Continuing with the protocol, the Access Protected Application 712 creates a digital signature Sig770 by signing the Public Key Exchange Key 740 as part of an attestation of the Access Protected Application 712, by the Attestation Key 732. In another embodiment, the Access Protected Application 712 creates a digital signature Sig770 by signing the Public Key Exchange Key 740 with some other key that has already been attested to as belonging to the Access Protected Application 712.

Sig770 is sent to the Auditor Device 730. The Auditor Device 730 verifies the signature, and that the key that created the signature was either the Attestation Key 732 or another key that had previously been attested to belong to the Access Protected Application 712. If these checks verify, the Auditor Device 730 creates Sig780 by digitally signing the Public Key Exchange Key 740 with the Auditor Private Signature Key 517. Both Sig770 and Sig780 are sent to the Access Protected Application 512.

The Access Protected Application 512 verifies the signature of the auditor on Public Key Exchange Key 740, and verifies that the key that created the signature was either the Attestation Key 732 or another key that had previously been attested to belong to the Access Protected Application 712.

Now the Access Protected Application 512 and the Access Protected Application 712 continue the Key Exchange Protocol to establish a shared symmetric key, which is then used by Access Protected Application 512 to encrypt and send the Access Signature Private Key 514 to the Access Protected Application 712. Access Protected Application 712 decrypts and stores the Access Signature Private Key 514 for future use.

The software in the Access Protected Application 512 and 712 prevents the duplication of the Private Keys 514, 516 except by going through a similar audited protocol.

In some embodiments, an additional External Access Party Device 700 creates a new Access Signature Private Key 714, and the original External Access Party application 512 digitally signs a certificate containing the new Access Verification Key 335 with the original External Access Party Private Key 514. In some embodiments, any use of any keys in the External Access Party Application to duplicate the Private Keys 514, 516 or to certify additional External Access Signature Keys 714 requires the creation of an Audit Record 522, 622 and Signature of the Audit Record 522, 622 verified by the Auditor Public Verification Key 518 prior to said duplication or certification.

Figure 8:
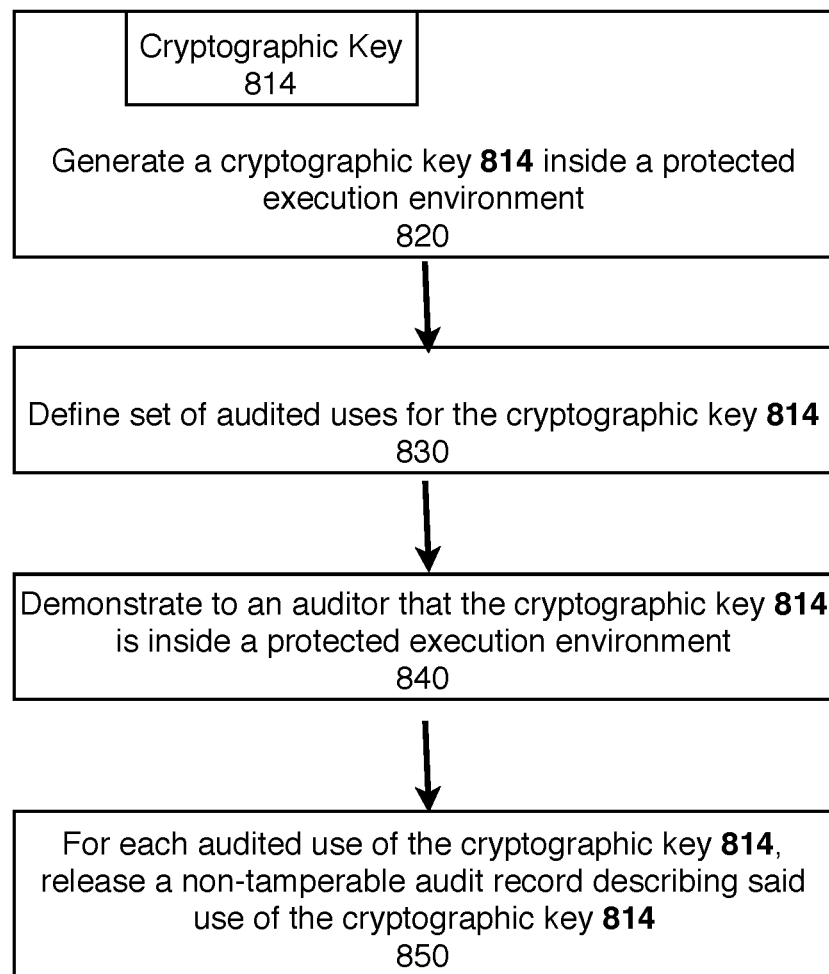
FIG. 8 is an illustration of a method used to audit the use of a cryptographic key 814.

FIG. 8 describes a method for an Auditor to ensure auditing the use of a cryptographic key. In step 820, a cryptographic key 814 is generated inside an attestable, unalterable, execution environment, such as the one described in FIG. 5. The reader will note the importance of this being an unalterable execution environment. For if the environment could be changed without any notification to the Auditor, for instance through a firmware update, and still have access to the Cryptographic Key 814, the resulting firmware could allow some use of the cryptographic Key 814 that did not generate an audit record.

In step 830 of FIG. 8, there is a defined set of uses of the cryptographic key 814 that must be audited. An embodiment of this was described above for auditing all uses of the Access Signature Private Key 514 for signing Access Payloads 318. Another embodiment of this was described above for auditing all uses of the Escrow Agent Private Key 516 for producing Decrypted Messages 618.

In step 840 of FIG. 8, there is a demonstration to an auditor that the cryptographic key 814 is inside a protected execution environment. An embodiment of this was described above with two important steps. One was that the Attestation Key 532 was created on the device 500 during manufacturing. If the Attestation Key 532 was not created on the device 500, the auditor would need to have a demonstration of the security of the generation, storage, and provisioning of the Attestation key 532 in order to be sure that a duplicate of the attestation key did not exist someplace else. The second important step was to have a demonstration while the auditor was physically present with the device 500 while knowing that the device 500 could not communicate over a network. This removed the possibility that the manufacturer could have certified the Attestation Key 532 even though it was not security resident in the type of device 500 claimed.

In step 850 of FIG. 8, there is a release of a non-tamperable audit record describing each use of the cryptographic key 814 as described in step 830 of FIG. 8. An embodiment of this was described above, in which the Access Protected Application 512 generates a hash chain 526 included in an audit record 522 of all uses of the Access Signature Private Key 514 to sign access Payloads 318. Another embodiment of this was described above, in which the Access Protected Application 512 in the External Access Party Device 500 generates a hash chain 628 and decrypted messages 618 included in an audit record 622 of all uses of an Escrow Agent Private Key 516 to decrypt messages. This includes auditing of any duplication of the Private Keys 514, 516 or delegation of the rights of the Access Signature Private Key 514 to another key, and allows such duplication or delegation only to other Access Protected Applications 512, 712 that are audited.

The roles of the auditor as described in this application can be duplicated so that multiple auditors can be required for any of the described roles. Also, the different roles of the auditor can be split among multiple auditors or multiple groups of auditors.

The above description is included to illustrate the operation of preferred embodiments, and is not meant to limit the scope of the invention. The scope of the invention is to be limited only by the following claims. From the above description, many variations will be apparent to one skilled in the art that would yet be encompassed by the spirit and scope of the present invention.

What is claimed is:

1. A computing device operated by a user of the computing device, said computing device comprising:
   an access control module having access to an access verification key, said access control module configured to perform a digital signature verification using the access verification key prior to allowing access to the computing device by an authorized external access entity, wherein the authorized external access entity is not the user, is not a module executing on the computing device, and is without knowledge of any user password, wherein digital signatures verified using the access verification key are not generated on the computing device; and
   coupled to the access control module and executing on the computing device, an output module configured to record information regarding access to the computing device by an authorized external access entity allowed by the access control module, wherein said recorded information cannot be modified or deleted by the authorized external access entity; whereby
   data in an application that executes on the computing device is accessible by the authorized external access entity and by the user.

2. The computing device of claim 1, wherein the access control module is further configured so that the user cannot modify the access control module in order to prevent an authorized external access entity from being verified.

3. A computing device operated by a user of the computing device, said computing device comprising:
   an access control module configured to verify, using an access verification key, a request generated externally to the computing device to access applications and data on the computing device by an authorized external access entity, where the authorized external access entity is a different entity than the user, is external to the computing device, and is without knowledge of any user password;
   an application authorization module configured to use an application verification key to verify a digitally signed request to authorize execution of an application and protection of the application and data of the application from access by said authorized external access entity;
   a first partition coupled to the application authorization module for executing applications that can be accessed by the user in which only applications authorized via a cryptographic verification performed by the application authorization module can execute;

a second partition for executing applications in which applications can execute without the authorization required for applications to execute in the first partition, wherein applications can be accessed by the authorized external access entity and by the user; and coupled to the first and second partitions and executing on the computing device, a set of protection modules configured to protect data used by applications authorized to execute in the first partition from access by applications executing in the second partition and to prevent the authorized external access entity from accessing protected data used by applications authorized to execute in the first partition.

4. The computing device of claim 3, further comprising an output module associated with the access control module, said output module configured to:

record information regarding authorized external access to the second partition, wherein the access control module is configured to prevent the authorized external access entity from modifying or deleting said recorded information; and output recorded information pertaining to authorized external access to the second partition.

5. The computing device of claim 4, wherein the output module is configured to enforce a delay in the output of a record of authorized external access.

6. The computing device of claim 3, wherein the access control module is further configured so that the user cannot modify the access control module in order to prevent an authorized external access entity from being verified.

7. The computing device of claim 3, where the verification to authorize an external access entity to access applications and data is performed by validating a digital signature, using an access verification key stored in said computing device, wherein the digital signature verified using the access verification key is generated externally to the computing device.

8. A method for allowing authorized access to some applications executing on a computing device operated by a user of the computing device while protecting other applications executing on the computing device from said authorized access, said method comprising the steps of:

verifying authorization to an external access entity to enable the authorized external access entity to access some applications executing on the computing device that are also accessible by the user, wherein the authorized external access entity is a different entity than the user, is external to the computing device, and is without knowledge of any user password;

validating approval by an application authorization module for protected applications executing on the computing device to be protected from access by the external access entity, wherein the application authorization module is a different entity than the user;

executing only said protected applications in a first partition in the computing device, wherein applications in the first partition are accessible by the user;

enabling said authorized external access entity and the user to access data of applications executing in a second partition in the computing device, wherein applications can execute without the authorization required for applications to execute in the first partition; and preventing the authorized external access entity from accessing applications and data used by applications executing in the first partition.

9. Method of claim 8, wherein the approval to protect an application from access by the authorized external access entity is performed by validating a digital signature, using an application verification key stored in said computing device.

10. Method of claim 8, where the authorization granted to the external access entity is performed by validating a digital signature, using an access verification key stored in said computing device, wherein the digital signature verified using the access verification key is generated externally to the computing device.

11. Method of claim 8, wherein:

information regarding authorized external access to the second partition is recorded in an output module; and recorded information regarding authorized external access to the second partition is outputted following an enforced time delay.

12. Method of claim 11, wherein the output module is configured to prevent the authorized external access entity from modifying or deleting said recorded information.

13. Method of claim 8, wherein the user cannot modify the verification process of an authorized external access entity in order to prevent an authorized external access entity from accessing the second partition.

* * * * *